US012675111B2

(12) United States Patent
Hellgren et al.

(10) Patent No.: US 12,675,111 B2
(45) Date of Patent: Jul. 7, 2026

(54) DEADLOCK PREDICTION FOR TRAFFIC PLANNING

(71) Applicant: Volvo Autonomous Solutions AB, Gothenburg (SE)

(72) Inventors: Jonas Hellgren, Gothenburg (SE); Åsa Rogenfelt, Gothenburg (SE)

(73) Assignee: Volvo Autonomous Solutions AB, Gothenburg (SE)

( * ) Notice: Subject to any disclaimer, the term of this patent is extended or adjusted under 35 U.S.C. 154(b) by 251 days.

(21) Appl. No.: 18/459,580

(22) Filed: Sep. 1, 2023

(65) Prior Publication Data

US 2025/0076877 A1      Mar. 6, 2025

(30) Foreign Application Priority Data

Sep. 20, 2022     (EP) ..................................... 22196693

(51) Int. Cl.
| | |
|---|---|
| *G05D 1/00* | (2024.01) |
| *G08G 1/01* | (2006.01) |

(52) U.S. Cl.
CPC ......... *G05D 1/0212* (2013.01); *G08G 1/0133* (2013.01)

(58) Field of Classification Search
CPC ........................... G05D 1/0212; G08G 1/0133
USPC ........................................................ 701/23
See application file for complete search history.

(56) References Cited

U.S. PATENT DOCUMENTS

| | | | |
|---|---|---|---|
| 12,391,279 B2 * | 8/2025 | Molinari | ........... B60W 60/0015 |
| 2012/0330540 A1 | 12/2012 | Ozaki et al. | |
| 2020/0139964 A1 * | 5/2020 | Kuninobu | ....... B60W 30/18154 |

| | | | |
|---|---|---|---|
| 2020/0258380 A1 * | 8/2020 | Wissing | ................... G08G 1/04 |
| 2021/0092069 A1 * | 3/2021 | Musleh | ................ G06N 3/0499 |
| 2021/0262813 A1 * | 8/2021 | Jornod | ................ G06Q 10/083 |
| 2022/0076568 A1 * | 3/2022 | Kwoczek | ............. G08G 1/0112 |

(Continued)

FOREIGN PATENT DOCUMENTS

| | | |
|---|---|---|
| EP | 3025206 A2 | 6/2016 |

OTHER PUBLICATIONS

European Communication pursuant to Article 94(3) EPC dated Jul. 9, 2025 in corresponding European Patent Application No. 22196693. 0, 5 pages.

(Continued)

*Primary Examiner* — Yazan A Soofi

(74) *Attorney, Agent, or Firm* — Jeffri A. Kaminski; Venable LLP

(57)         ABSTRACT

A method to determine if a traffic situation comprising a plurality of heavy-duty vehicles following a plurality of guided vehicle trajectories in a defined area will lead to a vehicle deadlock is described. For example, one method includes generating a traffic situation representation for the defined area comprising, for each of the plurality of vehicles, an initial vehicle trajectory segment location and a subsequent deadlock status, inputting the traffic situation representation to a traffic situation deadlock classifier which has been trained to output a traffic situation deadlock classification based on an input representation of a traffic situation in the defined area, and, based on the input traffic situation representation, generating a predicted deadlock classification of a subsequent traffic situation for that input traffic situation representation.

11 Claims, 10 Drawing Sheets

(56)                  References Cited

U.S. PATENT DOCUMENTS

2022/0315047 A1 * 10/2022 Probst ................... B60W 30/16
2024/0386794 A1 * 11/2024 Rogenfelt ............ G08G 1/0104

OTHER PUBLICATIONS

European Communication pursuant to Article 94(3) EPC dated Mar.
31, 2025 in corresponding European Patent Application No. 22196693.
0, 5 pages.
European Communication pursuant to Article 94(3) EPC dated Dec.
12, 2024 in corresponding European Patent Application No. 22196693.
0, 7 pages.
Extended European Search Report in corresponding European Appli-
cation No. 22196693.0 dated Jun. 7, 2023 (12 pages).
Partial European Search Report in corresponding European Appli-
cation No. 22196693.0 dated Mar. 6, 2023 (14 pages).
Yunlong Zhao et al; "Dynamic Resource Reservation Based Colli-
sion and Deadlock Prevention for Multi-AGVS"; Automation School,
Beijing University of Posts and Telecommunications, Beijing 100876,
China; date of publication Apr. 29, 2020; Digital Object Identifier
10.1109/Access.2020.2991190; IEEE Access; 11 pages.
Dong Li et al; "Artificial intelligence empowered multi-AGVs in
manufacturing systems"; arxiv.org, Cornell University Library, Sep.
8, 2019, XP081475028 (5 pages).
Krishna Moorthy et al; "Deadlock Prediction and Avoidance in an
AGV System"; Jun. 2000, XP055060564, Singapore-MIT Alliance
(69 pages).
European Summons to attend oral proceedings pursuant to Rule
115(1) EPC dated Feb. 10, 2026 in corresponding European Patent
Application No. 22196693.0, 8 pages.

* cited by examiner

DEADLOCK PREDICTION FOR TRAFFIC PLANNING

The present disclosure relates to a traffic planner which uses a deadlock prediction pre-processor for traffic planning.

In particular but not exclusively, the present disclosure relates to a traffic planner which uses a deadlock prediction pre-processor for predicting when and where deadlocks may occur along a plurality of guided vehicle trajectories within a defined region, for example, for heavy-duty vehicles. A heavy-duty vehicle may be a truck or truck and accessory type of vehicle, and/or comprise a moving machine or machinery mounted on a vehicle base. For example, some embodiments of the disclosed technology relate to a deadlock prediction pre-processor which is configured to predict the timing and locations of one or more traffic deadlocks between a fleet of heavy-duty vehicles following guided vehicle trajectories which pass through one or more traffic restricted locations along their trajectories within a predetermined or confined region or site and to related aspects.

BACKGROUND

A traffic deadlock occurs when multiple vehicles want to access the same location on their vehicle trajectories at the same time and so create a traffic situation where two or more of the vehicles are unable to advance to their next trajectory locations. It is particularly a problem when planning trajectories for a plurality of heavy-duty vehicles as these can be more constrained than other types of vehicles in terms of how they move along a trajectory. When planning guided trajectories for a plurality of vehicles forming a vehicle fleet operating within a particular area or site, it is accordingly important to try to minimise the risk of deadlocks occurring as each vehicle follows its planned trajectory if this crosses a planned trajectory of another vehicle or passes through a traffic constrained location where one or more other planned vehicle trajectories may pass.

Planning trajectories for autonomous or semi-autonomous heavy-duty vehicles operating in the same area can be particularly challenging as such vehicles may have a range of roles and operational tasks which use a motion support devices (MSDs) for their operation. MDSs may take the form of wide range of different physical devices, such as combustion engines, electric machines, friction brakes, regenerative brakes, shock absorbers, air bellows, and power steering pumps which may be individually controllable, for instance such that friction brakes may be applied at one wheel, i.e., a negative torque, while another wheel on the vehicle, perhaps even on the same wheel axle, is simultaneously used to generate a positive torque by means of an electric machine.

The operation of a heavy-duty vehicle is accordingly more complex than the operation of a more light-weight vehicle such as a car and extricating a plurality of heavy-duty vehicles from a deadlock situation may not be very straightforward, especially if the heavy-duty vehicle is operating autonomously. Even if a heavy-duty vehicle is semi-autonomously operated or manually driven or operated either from within the vehicle or remotely in some embodiments, if it encounters a deadlock along a guided trajectory it may require special skills and equipment as well as possibly reprogramming to be removed from the deadlock.

Reducing the likelihood of encountering a traffic deadlock is accordingly desirable when planning guided trajectories for a fleet of vehicles operating within the same area or site.

The disclosed technology seeks to mitigate, obviate, alleviate, or eliminate various issues known in the art which affect the ability of a vehicle to follow a guided trajectory in an area where traffic situations may include at least one area where vehicle occupancy is limited more than it is elsewhere along the vehicle trajectories.

SUMMARY STATEMENTS

Whilst the invention is defined by the accompanying claims, various aspects of the disclosed technology including the claimed technology are set out in this summary section with examples of some preferred embodiments and indications of possible technical benefits.

A first aspect of the disclosed technology relates to a traffic planner, for example, a computer implemented traffic planner, for planning a plurality of guided heavy-duty vehicle trajectories within a predetermined or defined region where a traffic situation has at least one traffic constrained location, the traffic planner comprising a deadlock classifier model trained to classify an traffic situation for vehicle traffic following guided vehicle trajectories within the defined region, wherein the trained deadlock classifier is configured to output a traffic situation deadlock classification based on an input traffic situation representation of multiple guided vehicle trajectories within the region, and wherein the traffic planner is configured, based on an input traffic situation representation of the area at a time period generating a predicted deadlock classification of a subsequent traffic situation for that input traffic situation representation at one or more subsequent time periods, to plan an action to perform along each guided vehicle trajectory in the predetermined region.

In some embodiments, the deadlock classifier is trained using a training data set generated by an traffic situation representation generator for the predetermined region, wherein the area traffic situation representation generator is configured to generate, for a plurality of vehicles following vehicle trajectories within the predetermined region, a binary traffic situation representation of the predetermined area comprising, for each of the plurality of vehicles, an initial vehicle trajectory segment location in the predetermined area and a subsequent deadlock status.

In some embodiments, the predicted deadlock classification classifies an traffic situation as having predicted deadlock classification status if the predicted traffic situation comprises at least two vehicles experiencing a traffic deadlock at or adjacent to the traffic constrained location at one or more subsequent time periods whilst each vehicle is guided along a planned vehicle trajectory path.

In some embodiments, the traffic planner plans, at each of the one or more subsequent time periods, a vehicle trajectory along which a vehicle either advances to a next segment location along its trajectory path or waits at its current segment location on its trajectory path.

In some embodiments, a deadlock classification represents two or more vehicles being unable to advance to their next segment locations along their trajectories in the one or more subsequent time periods.

In some embodiments, the heavy-duty vehicles are autonomous heavy-duty vehicles following predetermined guided vehicle trajectories in the predetermined region.

In some embodiments, the training data set generated by the traffic situation representation generator comprises a set of traffic situations for the predefined region, each traffic situation representing a given number of vehicles at a plurality of trajectory segment locations in the defined region, wherein each traffic situation is associated with a classification indicating if it is a vehicle deadlock status.

In some embodiments, the traffic constrained location within the predetermined region through which a plurality of vehicle trajectories pass comprises a one-way section of a route along which at least two vehicle trajectories pass in different directions.

Another, second, aspect of the disclosed technology, relates to a computer-implemented method of constructing a training data set comprising a set of traffic situations for training a traffic planner, for example, a traffic planner according to the first aspect.

In some embodiments of the second aspect, the method comprises, for a predetermined arear or site where two or more heavy-duty vehicle are configured to be guided along a planned trajectory in the area, defining an empty training set buffer comprising segments along each of the planned trajectories in at least a confined area within the area, placing each of the vehicles on different initial trajectory segments in the confined area, determining an initial period deadlock status of each vehicle, selecting, for each vehicle, a planned action for the next period, for example, a wait action or a move action, determining a next period deadlock status for each vehicle, determining an traffic situation representation deadlock status for the next period based the next period deadlock status of each vehicle, and adding the traffic situation representation and associated traffic situation representation deadlock status to the training data set.

In some embodiments, the method further comprises, if the traffic situation representation deadlock status indicates there is no deadlock, iteratively increasing the number of vehicles and for each iteration until a maximum number of vehicles is reached repeating placing each of the vehicles on different initial trajectory segments, determining an initial period deadlock status of each vehicle, selecting, for each vehicle, an action for the next period, determining a next period deadlock status for each vehicle, determining an traffic situation representation deadlock status for the next period based the next period deadlock status of each vehicle, and adding the area traffic situation representation and associated traffic situation representation deadlock status to the training data set.

In some embodiments, determining the next period deadlock status for each vehicle comprises determining if two or more vehicles have moved or not moved to the next segment along their trajectories in that period, wherein if two or more vehicles have not moved, those vehicles each have a deadlock status.

In some embodiments of the computer-implemented method of the second aspect, the planned action for the next period is randomly or pseudo-randomly selected.

In some embodiments, the training data set is constructed by the vehicles being placed randomly or pseudo randomly on the different initial trajectory segments.

In some embodiments, the vehicles comprise autonomous or semi-autonomous heavy-duty vehicles following pre-defined trajectories passing through the predetermined region.

Another, third aspect of the disclosed technology comprises a computer-implemented method of training a deadlock traffic classifier, the method comprising: generating a training data set using a method according to any one of the second aspect or its embodiments disclosed herein; and inputting training data from the training data set into the deadlock traffic classifier until the output from the deadlock traffic classifier meets an accuracy condition for an input binary traffic situation representation.

Another fourth aspect of the disclosed technology relates to a method of determining if vehicle traffic comprising a plurality of heavy-duty vehicles following a plurality of guided vehicle trajectories in an area will lead to a vehicle deadlock, the method comprising: generating a traffic situation representation of the area comprising, for each of the plurality of vehicles, an initial vehicle trajectory segment location and a subsequent deadlock status; inputting the traffic situation representation to a traffic deadline classifier trained to output a traffic deadlock classification based on an input traffic situation representation; and based on an input traffic representation, generating a predicted deadlock classification of subsequent traffic situation for that input traffic situation representation.

In some embodiments, the method is implemented using a neural network configured to receive as an input vector a binary string representation of a traffic situation, wherein binary string comprises a plurality of elements where a vehicle grid-lock may occur, each element representing an occupancy state of a traffic segment along one or more vehicle trajectories in the confined area. Here an occupancy state refers to if there a vehicle located in that segment or not. If a vehicle does occupy a node in a segment comprising one or more nodes, the segment occupancy state is occupied. Alternatively, if there is no vehicle occupying a segment comprising one or more nodes, the segment occupancy state is not occupied. The traffic trajectories at a site may be planned in some embodiments to manage segment occupancy.

In some embodiments, the traffic deadlock classifier is modelled using one of a feed forward neural network, a look-up table, a support vector machine, and a radial basis model.

In some embodiments, the traffic deadlock classifier is trained using a method according to the third aspect or any of its embodiments disclosed herein.

In some embodiments, the heavy-duty vehicles comprise, for example, an articulated truck and trailer configuration and occupies more than one node and/or segment on a vehicle trajectory path at any point in time.

Another, seventh, aspect of the disclosed technology comprises a computer-readable storage medium comprising computer-program code which, when executed by one or more processors or processing circuitry of an apparatus, causes the apparatus to implement a method according to any one of the second, third or fourth aspects or anyone their embodiments disclosed herein.

Another, sixth aspect, of the disclosed technology comprises a computer program carrier carrying a computer program comprising computer-program code, which, when loaded from the computer program carrier and executed by one or more processors or processing circuitry of an apparatus causes the apparatus to implement a method according to any one of the second, third or fourth aspects or any one of their embodiments disclosed herein, wherein the computer program carrier is one of an electronic signal, optical signal, radio signal or computer-readable storage medium.

Another, seventh aspect of the disclosed technology comprises a computer program product comprising computer-code which when loaded from memory and executed by one or more processors of a control circuit of a vehicle having an automated driving system, causes the vehicle to implement a method according to any one of the second, third or fourth aspects or any one of their embodiments disclosed herein.

Another, eighth aspect of the disclosed technology comprises a computer program comprising program code means for performing the steps of any of the methods according to the second, third, and further aspects or any one of their embodiments disclosed herein, when said program is loaded from memory and run on one or more processors or on processing circuitry of an apparatus.

Another, ninth, aspect of the disclosed technology relates to a method of configuring a site layout, wherein a plurality of heavy-duty vehicles follow guided trajectories between a plurality of locations within the site, the method comprising: performing a method according to the fourth aspect or any of its embodiments disclosed herein to determine if vehicle traffic comprising a plurality of vehicles following a plurality of predetermined vehicle trajectories in an area will lead to a vehicle deadlock; and if so, modifying the locations on the site until the predetermined vehicle trajectories do not lead to a deadlock.

The disclosed aspects and embodiments may be combined with each other in any suitable manner which would be apparent to someone of ordinary skill in the art.

BRIEF DESCRIPTION OF THE DRAWINGS

Some embodiments of the disclosed technology are described below with reference to the accompanying drawings which are by way of example only and in which:

FIG. 4A schematically illustrates another example of how a traffic deadlock may occur at a constrained location as a plurality of vehicles move along the same trajectory path within a site;

FIG. 4B schematically illustrates how adjusting a vehicle trajectory and/or reducing the number of vehicles travelling along the same trajectory path shown in FIG. 4A within a site can avoid a traffic deadlock occurring at the constrained location;

FIG. 6 illustrates schematically an example of how the plurality of vehicles following the trajectory path of FIG. 5 may avoid experiencing the deadlock by adjusting one or more of the vehicle trajectories;

Figure 10:
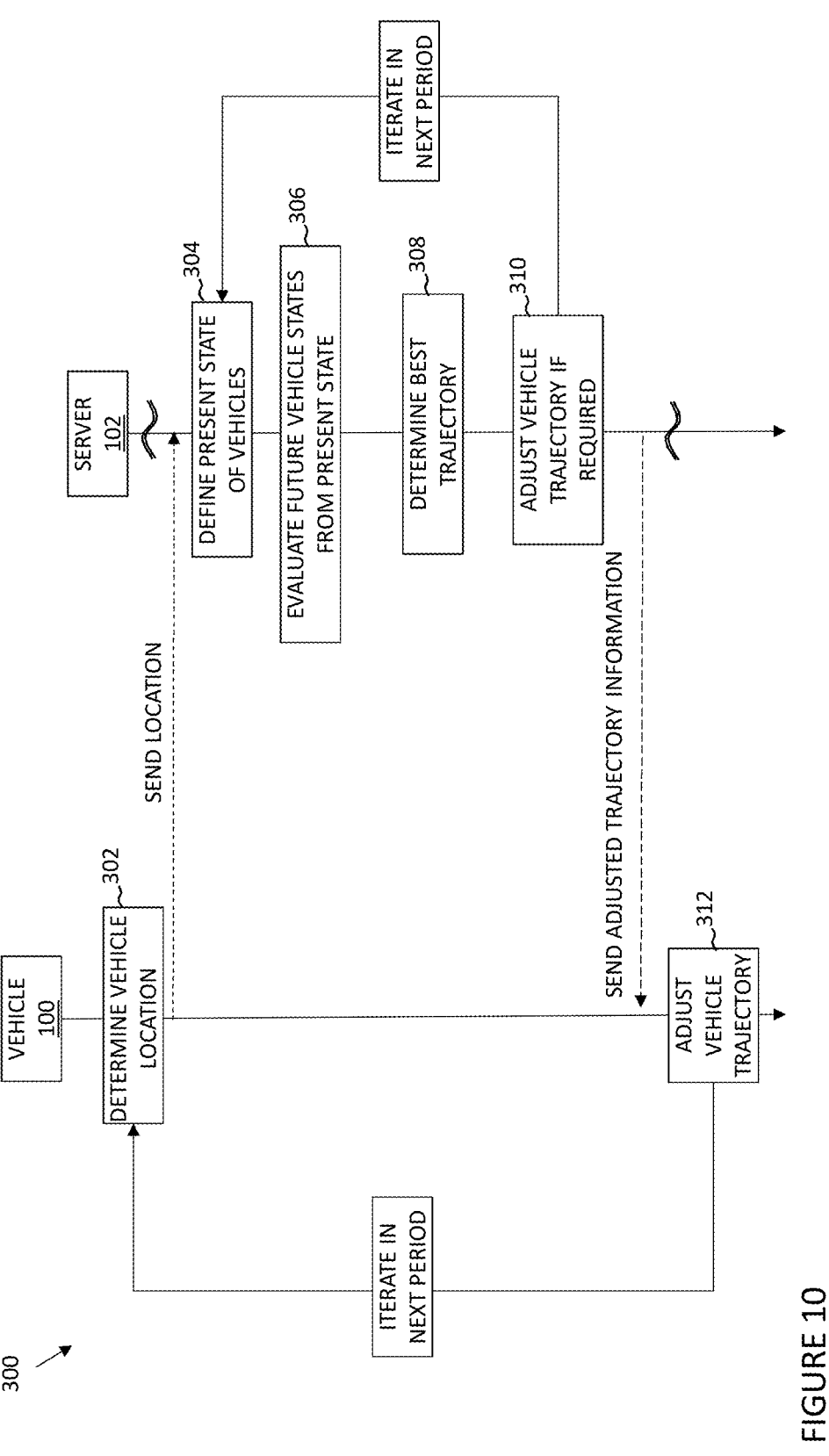
FIG. 10 illustrates schematically an example method of adjusting a vehicle's trajectory performed by a traffic planner according to some embodiments of the disclosed technology.

6 the apparatus to implement an embodiment of the method shown schematically in FIG. 10

DETAILED DESCRIPTION

Aspects of the present disclosure will be described more fully hereinafter with reference to the accompanying drawings. The apparatus and method disclosed herein can, however, be realized in many different forms and should not be construed as being limited to the aspects set forth herein. Steps, whether explicitly referred to a such or if implicit, may be re-ordered or omitted if not essential to some of the disclosed embodiments. Like numbers in the drawings refer to like elements throughout.

The terminology used herein is for the purpose of describing particular aspects of the disclosure only, and is not intended to limit the disclosed technology embodiments described herein. As used herein, the singular forms "a", "an" and "the" are intended to include the plural forms as well, unless the context clearly indicates otherwise.

Figure 1:
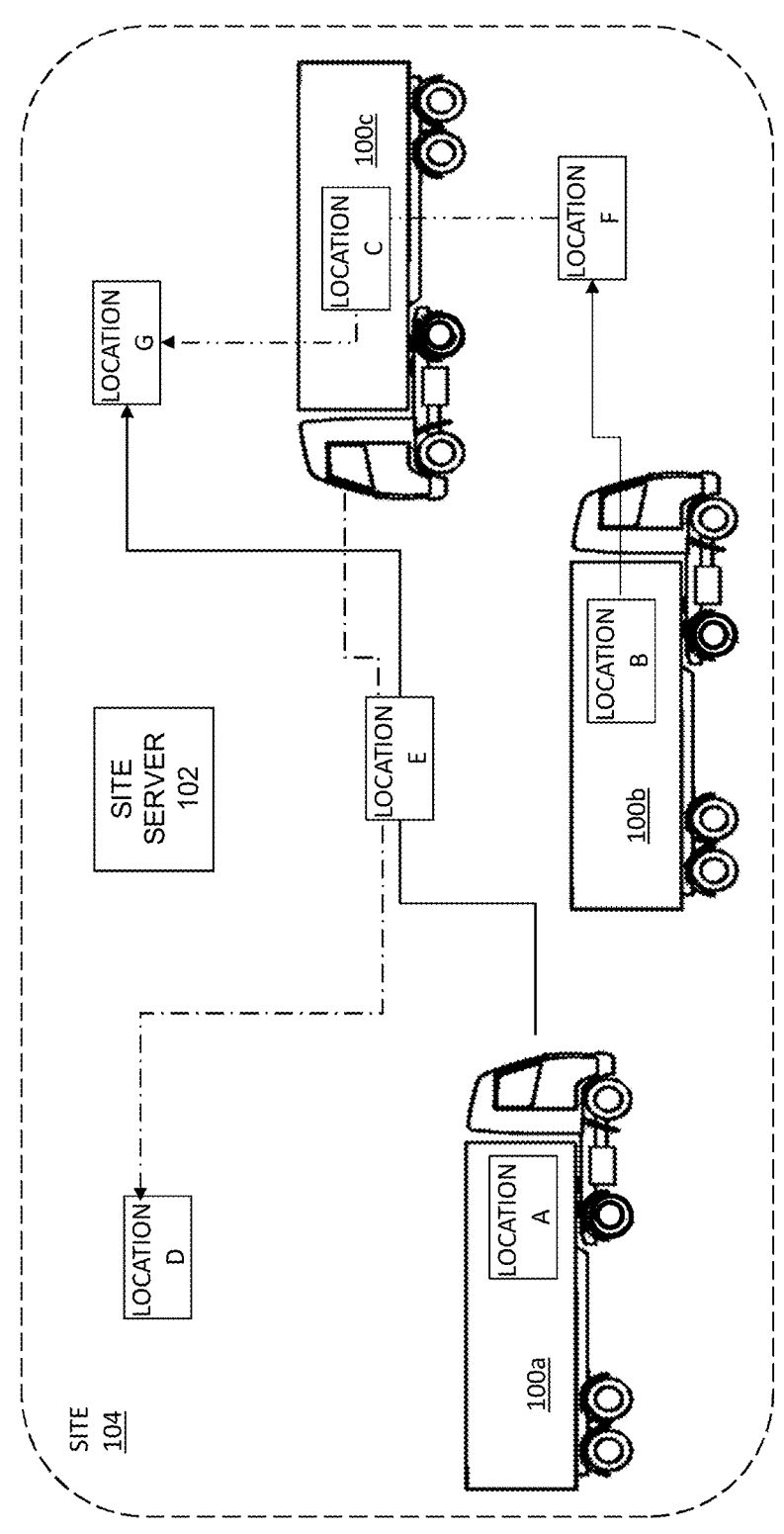
FIG. 1 schematically illustrates an example of a fleet of vehicles following guided trajectories within a site according to some embodiments of the disclosed technology.

FIG. 1 of the accompanying drawings illustrates schematically an example of a fleet of vehicles 100a, 100b, 100c following guided trajectories between a plurality of different locations A-G within a site 104 such as a confined area. The movement of the vehicles 100a-c along their trajectories is in some embodiments fully autonomous, in other words, their speed, direction of travel, and the path of the vehicle trajectories are all determined by a traffic planner for the site 104. Nonetheless, in some embodiments, despite the traffic planner configuring vehicle trajectories to guide the vehicles along their trajectory paths, the vehicle may be manually controlled for some tasks and in some embodiments the vehicles may be guided semi-autonomously and/or remotely, for example, from a site server or back office server 102 in a manner which allows them to follow a planned trajectory.

At a site where a number of vehicles will be guided autonomously or semi-autonomously along one or more planned trajectories, each vehicle's trajectory, meaning its direction along a path and speed of travel along that path, is ideally planned in advance using a traffic planner. The traffic planner in other words, configures the site traffic in advance of any vehicles being deployed and guided along vehicle trajectories in a way that avoids any problems such as vehicle jams, unnecessary delays or deadlocks, where the trajectories planned result in a plurality of vehicles being unable to move because of the location they are in having certain traffic constraints on vehicle occupancy limits in that location.

According to the disclosed technology, a number of candidate vehicle trajectories within a site are modelled and assessed using a vehicle trajectory classifier to see if they will lead to a traffic deadlock at the site. The classification of each of the vehicle trajectories is made offline in a computer model of the site of interest and the output of the classifier is made available to the traffic planner when a candidate vehicle trajectory is being assessed by the traffic planner. However, in some embodiments, a traffic planner may also respond dynamically to traffic situations as they occur on the site of interest, and it is possible in some embodiments to use the traffic planner to adjust vehicle trajectories in real-time by drawing on a set of guided vehicle trajectories that have been generated in advance and classified for that site by a deadlock classifier as leading to a potential deadlock or not. This may allow dynamic adjustment of guided trajectories for one or more vehicles at a site in some embodiments. It is also possible to use the vehicle trajectory deadlock classifier to explore vehicle trajectories when planning sites to avoid potential deadlocks and maximise the efficiency of operations at the site in some embodiments.

The traffic planner may be implemented on a stand-alone server or server system according to the disclosed technology. The traffic planner is configured to assess a plurality of vehicle trajectories where a vehicle trajectory comprises a trajectory path, direction of travel, and action along the trajectory path in the direction of travel, for example, an action to pause at a particular segment of the trajectory, or to move to the next segment along the trajectory. A traffic planner for a site accordingly has the objective of planning how a plurality of vehicles should move or be guided along one or more trajectory paths in a site or similar defined area or region. In some embodiments, the defined area or region may comprise a route. Ideally, the guided vehicle trajectories at a site are planned in a way that avoids deadlocks occurring so as to maximise their individual or fleet efficiency. For example, vehicle trajectories that avoid deadlocks may allow vehicles at a site to function in a way that optimises their operational behaviour and fuel consumption, and ideally so that the site of operations as a whole is run efficiently.

According to the disclosed technology, classification of a candidate vehicle trajectory as a trajectory leading to a deadlock or not is made offline in a computer model of the site of interest. The computer model uses a neural network classifier model which is fed candidate vehicle trajectories and predicts which candidate vehicle trajectories will result in a traffic deadlock situation at the site with a planning horizon.

Each vehicle trajectory is modelled by segmenting the trajectory and treating each segment as a node which can be occupied or unoccupied by a vehicle. One or more vehicles may follow the same trajectory.

Each candidate vehicle trajectory is accordingly modelled as a series of nodes located along the path of the trajectory being modelled. If all of the vehicles travelled all of the time at the same speed, the nodes would be equally distanced apart along each trajectory. In practice, in some embodiments, as each vehicle may accelerate and deaccelerate and travel at different speeds along its trajectory but this can be modelled by moving the distance between nodes to reflect the average vehicle speed between nodes.

In some embodiments, the traffic planner determines which one or more candidate vehicle trajectories of a set of candidate vehicle trajectory paths for a vehicle operating along a guided trajectory on a site or similar defined area could result in a deadlock for that vehicle. In some embodiments, the traffic planner determines which candidate vehicle trajectories of a set of candidate vehicle trajectory paths for a fleet of vehicles operating along a guided trajectory on a site or similar defined area could result in a deadlock for a subset of the vehicles forming the fleet of vehicles. The traffic planner assesses what possible candidate actions by a vehicle at some initial time t0 may result in that vehicle following a candidate vehicle trajectory path which could lead to a deadlock at some later time t within its planning horizon (see FIG. 8 for an illustration of how the planning horizon is modelled for candidate vehicle trajectories).

In this way the traffic planner determines what actions should occur to guide the vehicle along the path within the planning horizon. For example, should the vehicle stay at a particular location on the path for one or more time intervals or not to avoid a future deadlock with another vehicle also travelling along a guided trajectory within the site. How the traffic planner performs a search for suitable vehicle trajectories using a trajectory classifier according to the disclosed technology is discussed in more detail later below in the context of FIG. 8.

FIG. 1 illustrates one example of how a traffic deadlock may occur, consider the example scenario of FIG. 1, where vehicle 100a starts at location A and moves along a planned trajectory via location E to location G. Location E however is a traffic constrained location, for example, a location where there is a single lane allowing traffic to only pass through in one direction at a time. Vehicle 100b starts at location B and moves along a trajectory via locations F and C to its destination at location G. Vehicle 100c starts at location C and arrives at location D via location E. As shown, each of the vehicles 100a,b,c follows a different vehicle trajectory path however, in some embodiments two or more or all of the vehicles may be located on the same vehicle trajectory path but at different nodes or segments along that path (see FIGS. 4A, 4B, 5 and 6 for examples of multiple vehicles being modelled as following the same trajectory path.

Returning to FIG. 1, as the planned trajectories of both vehicles 100a and 100c pass through the constrained traffic location E, there is a possibility of a deadlock at location E if either vehicle arrives at location E before the other vehicle has left location E depending on how the vehicle trajectories have modelled the real-life traffic constraints at location E. For example, if location E only allows one vehicle in at a time, and then if the planned vehicle trajectories resulted in vehicle 100a occupying location E when location G is occupied by vehicle 100b, vehicle 100a could not vacate the traffic constrained location E. Moreover, again depending on timing, vehicle 100c may not be able to move into location E to reach its destination location D as vehicle A is not able to move out of location E.

Other examples of possible traffic grid-lock locations include any locations which have limited capacity for vehicle occupancy compared to potential vehicle throughput. This may include sections of a route with lane restrictions, loading sites, dumping sites, fueling sites, or any other locations which have a limited capacity for providing or supporting a vehicle service or task, and where access is accordingly limited. Planning vehicle trajectories which pass through such locations is challenging as it is not always possible to predict easily when a potential deadlock could occur, as opposed to a vehicle merely being delayed along its trajectory, as the movement of other vehicles must be taken into account.

Figure 2:
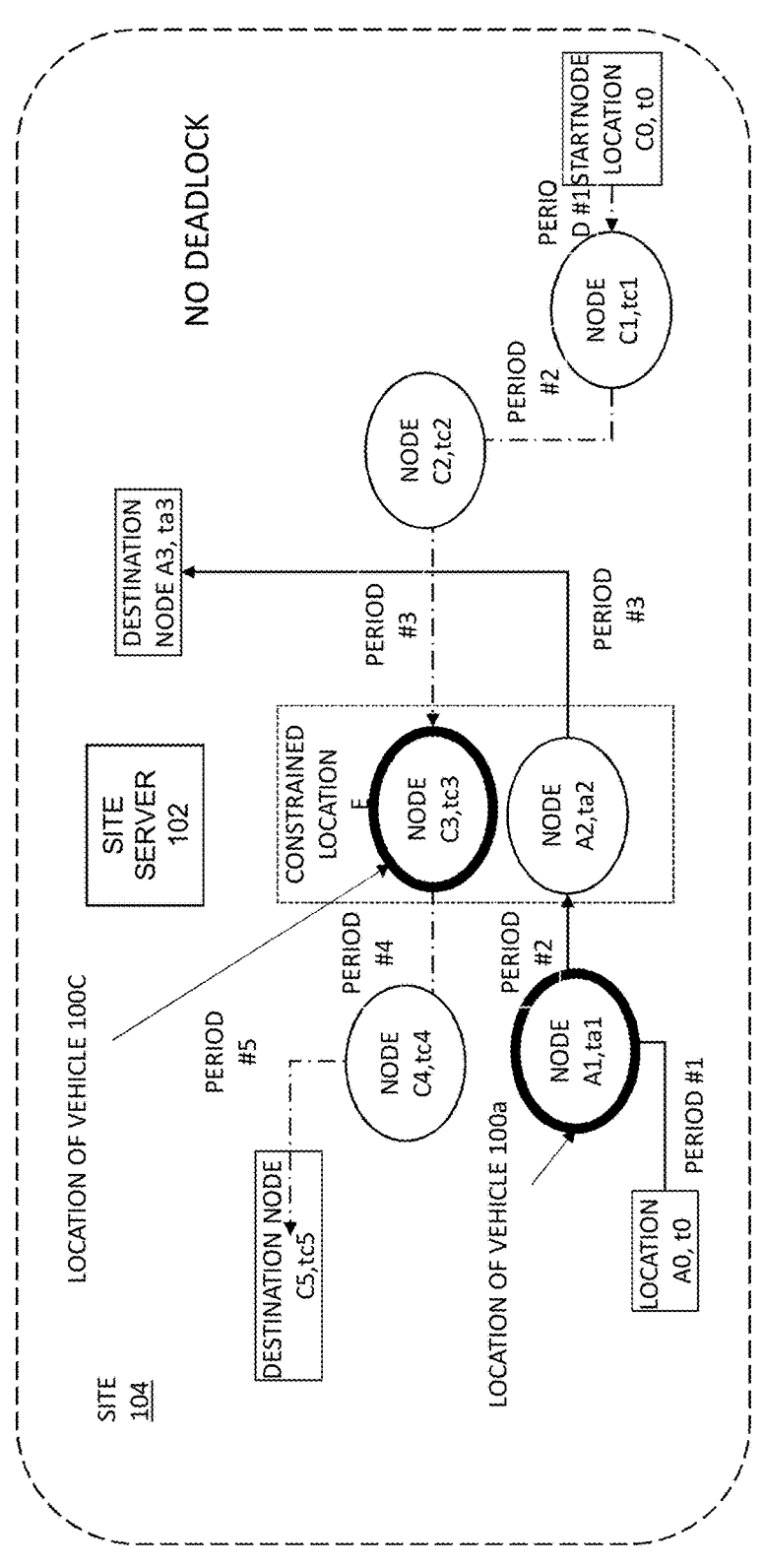
FIG. 2 schematically illustrates an example of how a traffic delay may occur at a constrained location as a plurality of vehicles move along a plurality of vehicle trajectories within a site.
Figure 3:
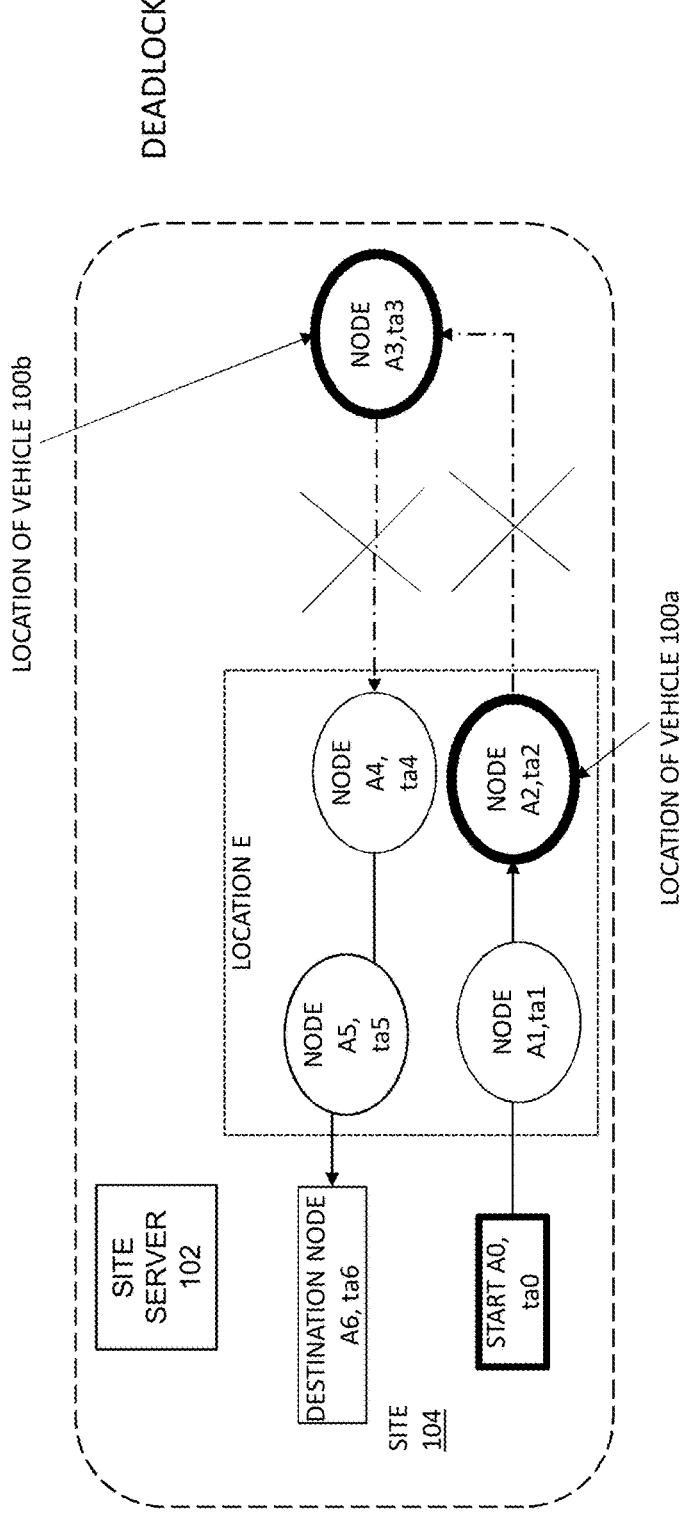
FIG. 3 schematically illustrates an example of how a traffic deadlock may occur at a constrained location as a plurality of vehicles move along a plurality of vehicle trajectories within a site.

FIG. 2 shows schematically an example of how a traffic delay may occur at a constrained location E as a plurality of vehicles move along a plurality of vehicle trajectories within a site which can be compared to FIG. 3 where a traffic deadlock has occurred. FIG. 2 shows how a model of the vehicle trajectories within a site can be modelled by providing a plurality of nodes are spaced along each vehicle trajectory within the site 104 to represent the locations of the vehicle following that trajectory after each time interval has passed.

If the vehicle speeds are assumed to be constant along each vehicle trajectory, then the nodes will be located along each vehicle trajectory at equal time intervals or periods of time. If, however, a planned vehicle trajectory requires a vehicle to move more slowly along its trajectory within the site than other vehicles move along their trajectories, its nodes will be spaced closer together than the nodes along the other trajectories. Similarly, if a planned vehicle trajectory requires a vehicle to move more quickly along its trajectory path, then the nodes along that trajectory path will be spaced further apart as the vehicle will have moved more along its trajectory in that time period.

Each of the nodes on a trajectory path is accordingly either occupied by a vehicle or empty. If only one vehicle is following a trajectory path, then only one node will be occupied in a given time period by a vehicle. If, however, more than one vehicle is following the same trajectory path, then more than one node may be occupied in any given time period along the same trajectory path.

In FIG. 2 each vehicle's trajectory path has been segmented into a plurality of nodes spaced apart along the trajectory path. As shown in FIG. 2, vehicle 100a is at node A0 at time period t0, progresses to the location along the trajectory shown as node A1 at time period ta1, and will occupy node A2 at time period ta2. Node A2 is at location E which is a constrained location. Vehicle A reaches its destination node A3 at time period ta3. Vehicle 100c is at node C0 at time period t0, occupies node C1 in time period tc1 and arrives at location E after the second time period along its trajectory, tc3. It takes longer on its trajectory to reach its destination passing through node C4 at time period tc4 before reaching destination node C5 in the time period tc5. In this case, the time period tc3 along the trajectory of vehicle 100c is equivalent to time period ta2 along the trajectory of vehicle 100a from a planning perspective.

In FIG. 2, although each of the two planned vehicle trajectories passes through the traffic constrained location E no deadlock occurs as vehicle 100A can move into node A2 from node A1 and out from node A2 to node A3 without being impeded by the location of vehicle 100c when it is located in the constrained location, as even if vehicle 100a arrives at node A1 whilst vehicle 100c is at node C2, which ever vehicle moves into location E first only delays the progress of the other vehicle, in other words, if vehicle 100a arrives at node A1 just before vehicle 100c occupies node C3, it cannot move to node A2 as with the constrained location E, only one node can be occupied in any given time period or interval. However, vehicle 100c will in the next time period vacate node C3 and occupy C4 and at this point vehicle 100a can occupy node A2. In other words, in a traffic constrained location, occupying one node within the traffic constrained location means all nodes are considered occupied in that traffic constrained location, but a deadlock only occurs if the vehicle occupying a node in the constrained location cannot vacate the constrained location and by staying within the constrained location prevents other vehicle movements which would allow it to vacate the constrained location.

FIG. 3 however shows an alternative scenario where there are two nodes on each vehicle's trajectory as it passes through a constrained traffic location E and a deadlock occurs as vehicle 100b at node A3 cannot move to node A4 until the vehicle at node A2 has vacated node A2 and moved to node A3. This illustrates how if a node on a trajectory within the traffic constrained location E is occupied, none of the other nodes on a trajectory within the constrained location can be occupied.

Deadlocks accordingly creates a challenge when planning vehicle trajectories at a site, in other words, not just the paths to be followed by the speed and direction of one or more vehicles moving along each trajectory path in the site if the site (or other defined area) includes at least one traffic constrained location. In other words, there is a need to collectively plan the guided vehicle trajectories around the site so as to reduce the likelihood of any vehicle blocking the path of other vehicle(s) through a traffic constrained location such as that shown in FIG. 3.

Figures 4A, 4B:
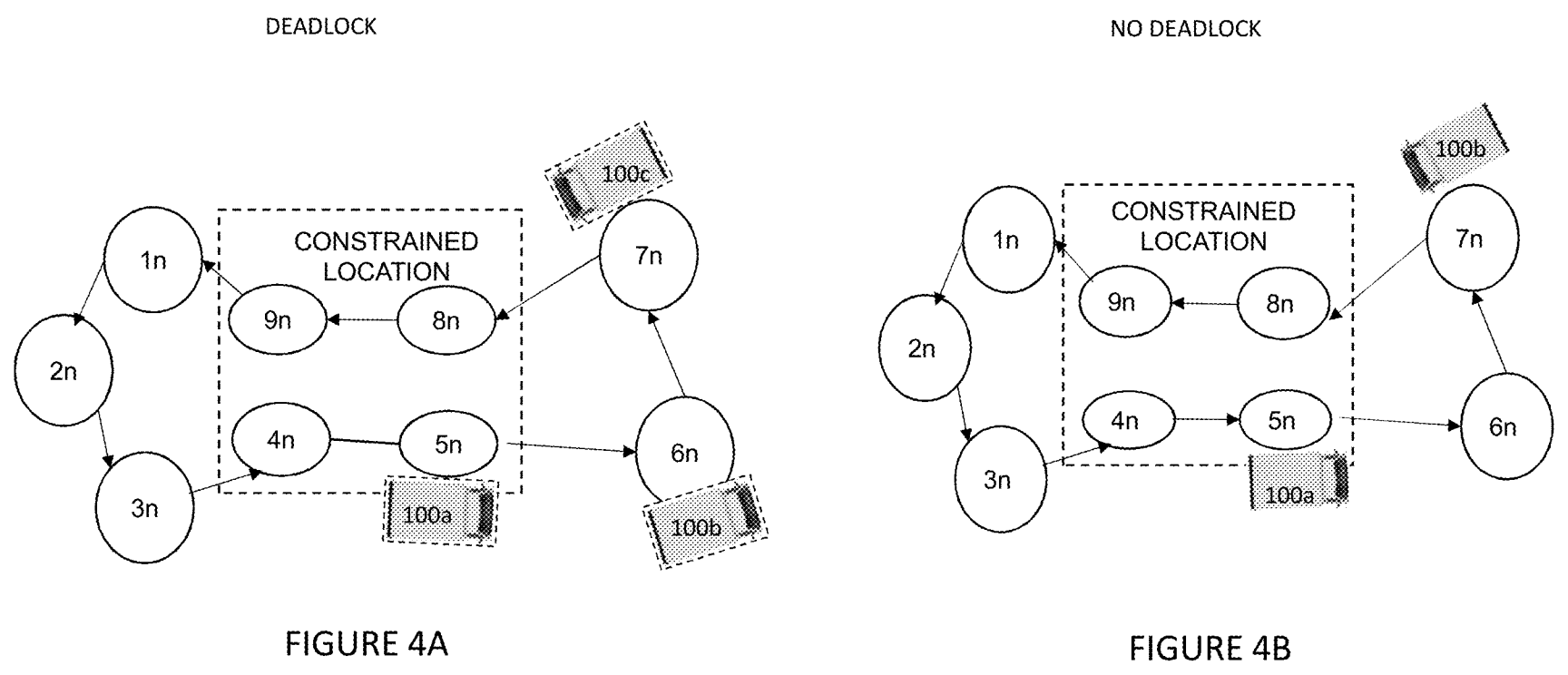

FIG. 4A schematically illustrates another example where deadlock occurs for a plurality of vehicles are following the same trajectory path which passes through a constrained location. In FIG. 4A, the trajectory is cyclical and comprises nodes 1N-9N of which nodes 4N, 5N, and 8N and 9N pass through a constrained location. FIG. 4A shows how a traffic deadlock may occur as a plurality of vehicles move along a single vehicle trajectory which passes more than once through a constrained traffic location. As shown in FIG. 4A, vehicle 100a at node 5N cannot move in the next time period to node 6N as vehicle 100b is occupying node 6N and cannot move as its next node would be 7N which is occupied by vehicle 100c which cannot move into the constrained location node 8N due to vehicle 100a occupying the constrained location already.

FIG. 4B in contrast illustrates schematically how reducing the number of vehicles travelling along the trajectory shown in FIG. 4A to just two vehicles, 100a, b separated by at least one node, could not result in a deadlock situation, as one vehicle will never block the other vehicle from entering the constrained area or leaving it when following the guided trajectory as shown. In other words, by changing the number and/or spacing of vehicles following a guided trajectory a gridlock situation may be avoided. Spacing between vehicles following the same trajectory path can be achieved by changing their relative speeds between nodes and/or having one vehicle wait at a node, for example, by being modelled to occupy a node for a plurality of time intervals or periods.

The traffic planner of the disclosed technology allows traffic planning to be performed in a way that allows candidate vehicle trajectories to be assess so that trajectories can be planned to maximise the number of vehicles can share the same trajectory path without a gridlock occurring.

Figure 5:
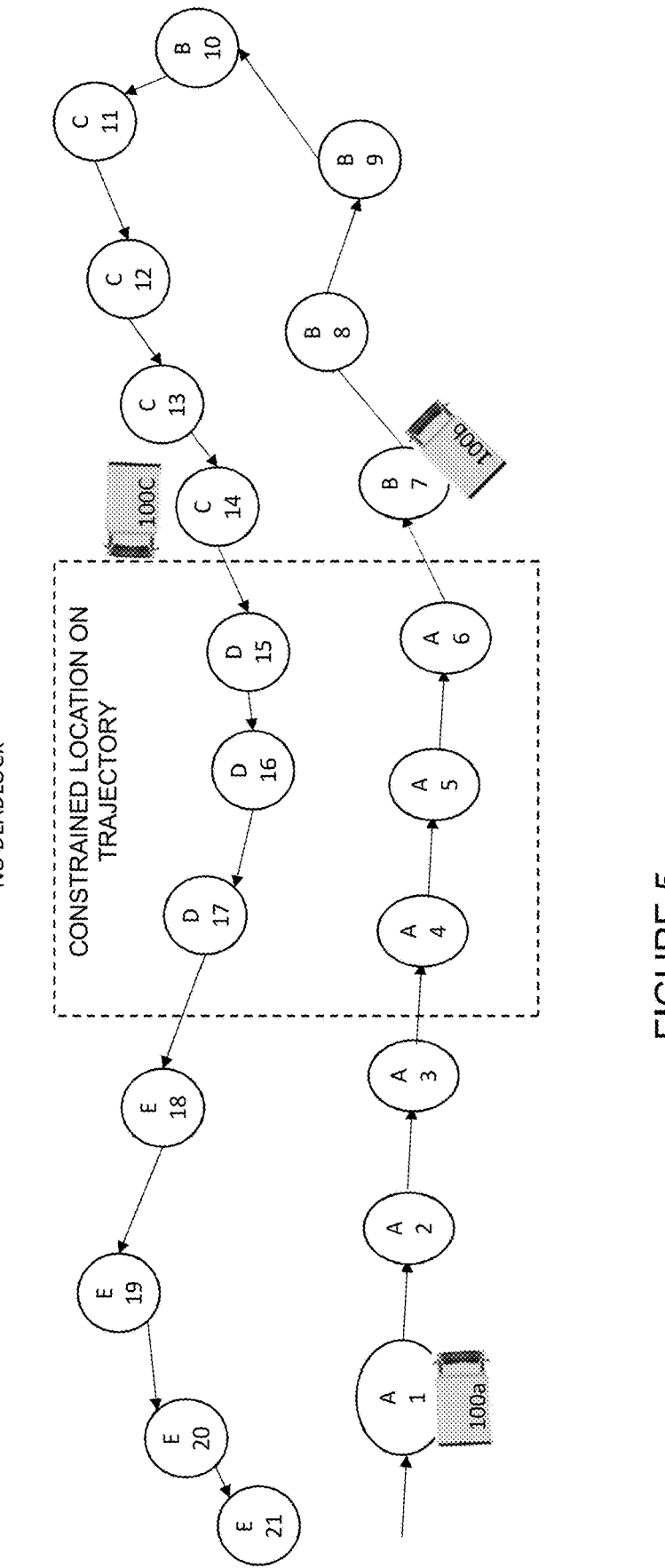
FIG. 5 illustrates schematically an example of another vehicle trajectory path shared by a plurality of vehicles which encounter a deadlock.
Figure 6:
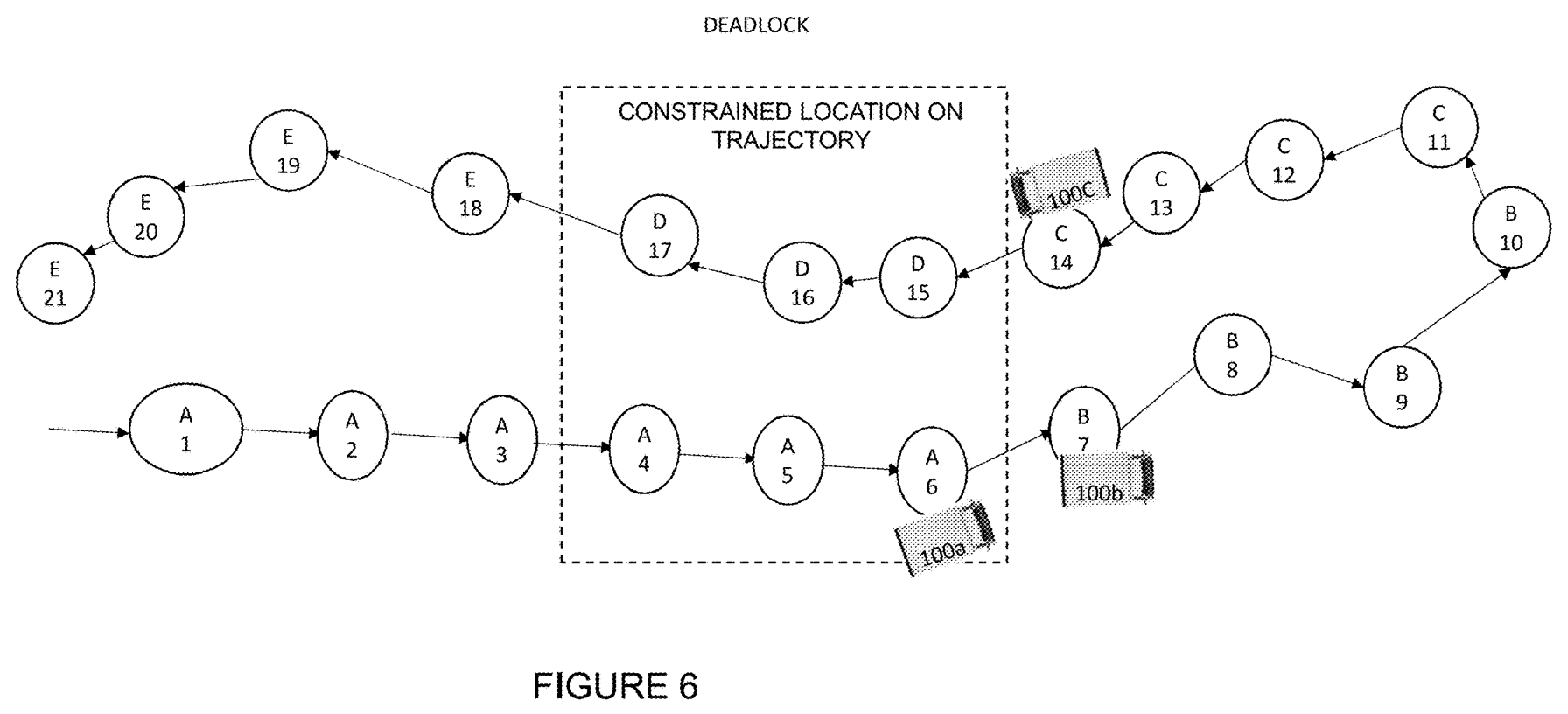

FIGS. 5 and 6 illustrates how deadlocks can develop for a guided vehicle trajectory over a longer time perspective than that shown in FIGS. 4A and 4B. In FIGS. 5 and 6, a single trajectory path has been split into a plurality of path segments, each path segment comprising a plurality of nodes. As shown, segment A comprises nodes 1 to 6, segment B nodes 7 to 10, segment C nodes 11 to 14, segment D nodes 15 to 17, and segment E nodes 18 to 21. Event node is associated with a segment, and only one vehicle is allowed per segment. Vehicle 100a occupies node 1 in segment A, vehicle 100b occupies node 7 in segment B and vehicle 100c occupies node 14 segment C in FIG. 5. If the vehicle 100a at node 1 in segment A decides to move on one node from node 1 to node 2 it will remain the sole occupant of segment A, and vehicles 100b,c could remain whether they are or will move on as well. For example, vehicle 100b could wait or move on and remain in segment B by moving to node B8. Similarly vehicle 100c could wait or move to node 15 in segment D. However, if the vehicle 100b at node B7 in FIG. 5 waits for multiple periods of time whilst vehicle 100c waits at node C14 yet vehicle 100a moves on from node A1 to node A6, then a deadlock situation arises as shown in FIG. 6. FIG. 6 presents a deadlock, as none of the vehicle can move between segments as each segment can only be occupied by a single vehicle, and in the traffic constrained area, occupying one of the nodes, e.g. A4, A5, A6, D15, D16, D17 means that all nodes in both segments will be treated as occupied.

Some of the disclosed embodiments of a traffic planner, given the situation in FIG. 5 where the vehicles are modelled as occupying at node 1, 10 and 11 at an initial arbitrary time t0, are able to determine that the vehicle at node 1 must wait at node to avoid a future deadlock by using a candidate trajectory which has been previously classified as not leading to a deadlock.

Table 1 below shows schematically how a traffic situation at a site can be expressed by a binary string or one-dimensional vector array, $\bar{x}$, one element per segment along a vehicle trajectory comprising a plurality of segments in the site. Here a segment is a segment along a vehicle trajectory path comprising one or more nodes.

A "1" indicates vehicle occupancy of that segment and a zero indicates no vehicle occupies the segment. Table 1 expresses multiple traffic situations, in other words, multiple instances of $\bar{x}$ which are by way of example only, as would be readily appreciated by anyone of ordinary skill in the art. The different vector $\bar{x}$ in the table 1 below accordingly represent different traffic situations at a site, in other words, the different combinations of vehicle occupancies which may occur in the site as vehicles move along their trajectories. The length of $\bar{x}$ has a length equal to the number of segments in a site at issue.

Figure 8:
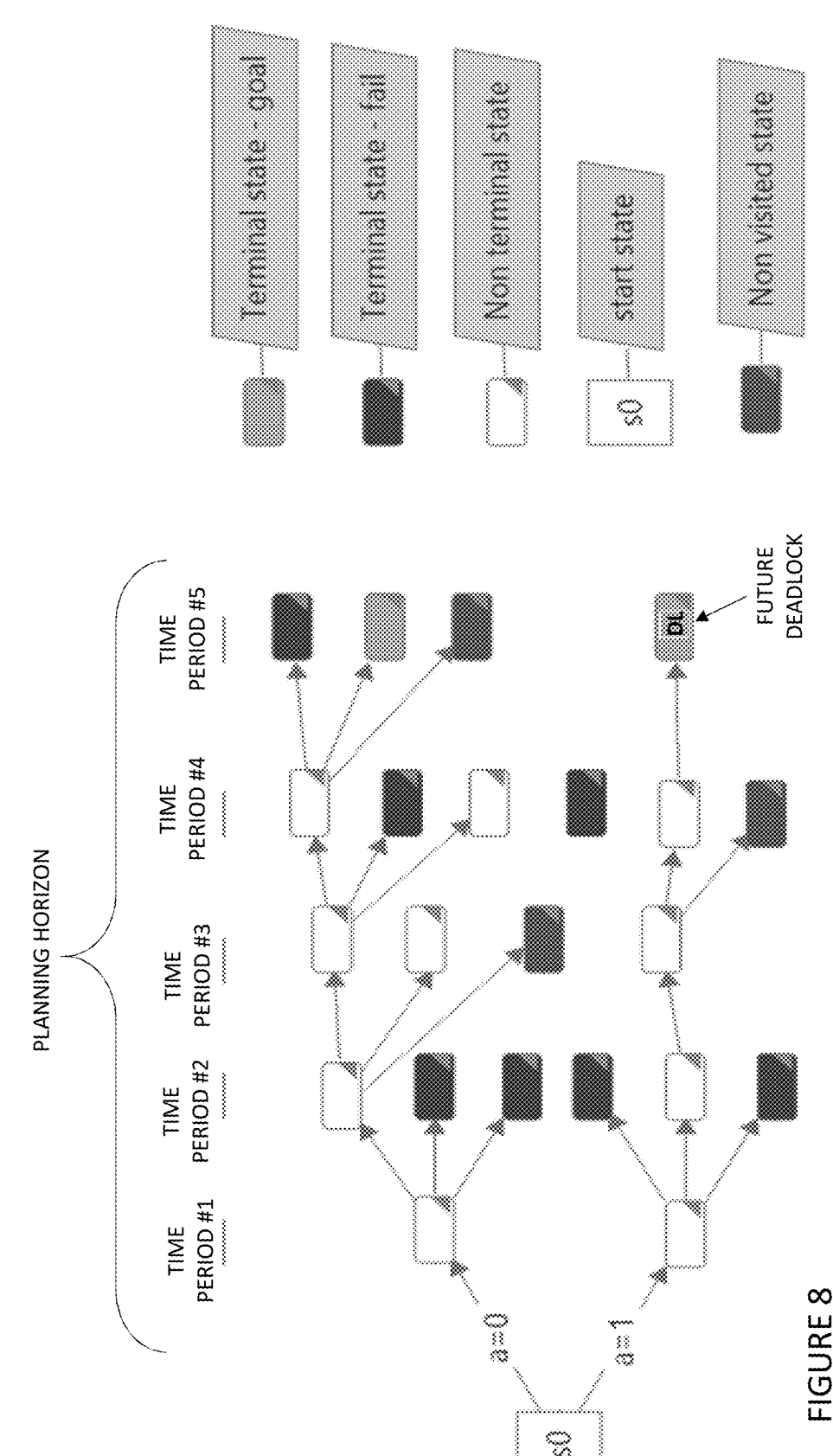
FIG. 8 illustrates schematically an example embodiment of a search tree of a traffic planner which uses a deadlock classifier for planning vehicle trajectories according to some embodiments of the disclosed technology.

As illustrated in the example below, Table 1 maps a plurality of candidate trajectories at an arbitrary start time period t0 to traffic situations at a subsequent time period where the traffic situations are assigned a classification by the model. Each traffic situation x comprises a number of candidate vehicle trajectories. As shown, each candidate trajectory comprises segments A, B, C, D, E and a "yes" classification label means the candidate trajectory will lead to a deadlock traffic situation within a planning horizon and a "no" meaning the candidate trajectory will not lead to a deadlock traffic situation within the planning horizon. FIG. 8 shows an example of a planning horizon and is described in more detail later below.

TABLE 1

| Candidate Trajectory | A | B | C | D | E | Traffic Situation at Site in Deadlock? | Comment |
|---|---|---|---|---|---|---|---|
| 1 | 0 | 1 | 1 | 0 | 0 | no | See FIGS. 4A and 4B |
| 2 | 1 | 1 | 1 | 0 | 0 | yes | See FIG. 5, this assumes a vehicle is occupying each of segments A, B and C. |
| 3 | 0 | 1 | 1 | 0 | 0 | no | As FIG. 5 but with only vehicles in segment B and C |
| 4 | 0 | 1 | 1 | 1 | 1 | no | FIG. 5, crowded, but anyway no deadlock as segment A is not occupied, meaning no traffic moving into to constrained location from opposite direction. |
| 5 | 1 | 1 | 1 | 0 | 1 | yes | FIG. 6 and a vehicle at segment E |

To find out which candidate planned trajectories may lead to a deadlock when modelling a number of candidate planned trajectories for a sit, the traffic planner uses a deadlock trajectory classifier model according to the disclosed embodiments such as those described later below. The classifier model takes as input a traffic situation and analyses it to determine if it represents a deadlock situation or not. By determining which actions on vehicles in which segments of the site may result in a deadlock traffic situation, it is possible to anticipate when a deadlock may occur several time periods in advance of when it actually would occur (or when there is a reasonable confidence level it would occur).

Figures 7A, 7B:
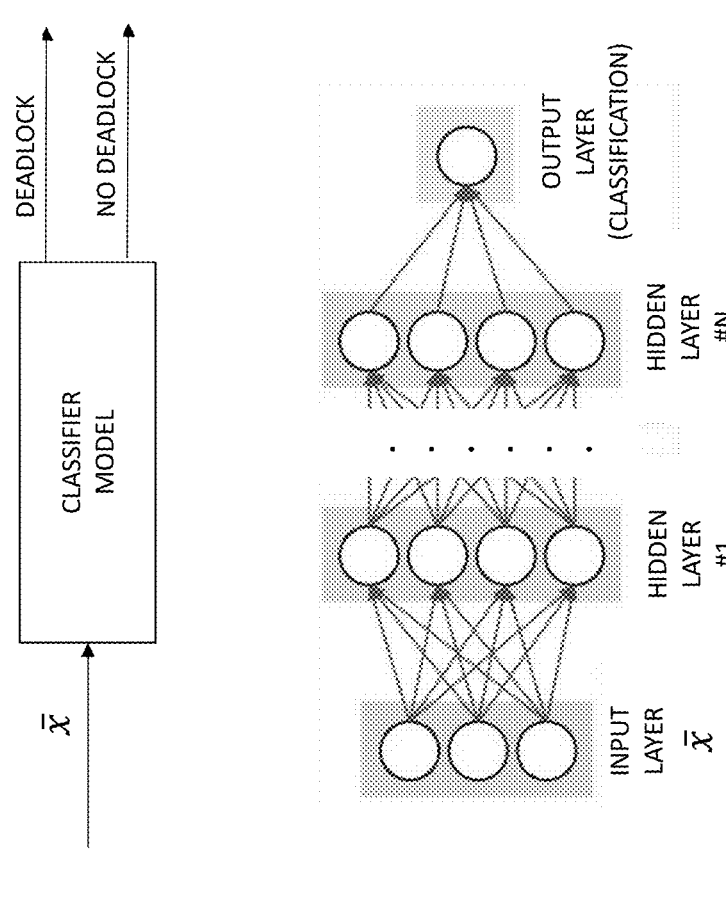
FIGS. 7A and 7B illustrate schematically examples of deadlock classifier models according to some embodiments of the disclosed technology.

FIGS. 7A and 7B illustrate schematically simply examples of how a deadlock classifier model according to some embodiments of the disclosed technology may classify a traffic situation at a site as representing a deadlock, when provided with input traffic situation comprising a vector $\bar{x}$ representing vehicle occupancy along one or more segments along a candidate vehicle trajectory path.

FIG. 7A shows schematically how a deadlock classifier model according to the disclosed technology provided with an input vector $\bar{x}$ representing a traffic situation at a site comprising one or more planned trajectories of a plurality of vehicles may be trained to classify the input $\bar{x}$ as either representing a site traffic scenario in which a plurality of vehicles, each following a planned vehicle trajectory ultimately lead to a deadlock traffic situation at that site or not. The input traffic situation $\bar{x}$ for the site may also be considered to representation set of planned vehicle trajectories at the site at a given point in time.

The classifier models illustrated schematically in FIGS. 7A and 7B are by way of example only, any suitable classifier may be used which can take as input a traffic situation at a site and which can be trained to classify if that traffic situation input is a deadlock traffic situation or not at the site. The output of the model is a classification for that input traffic situation $\bar{x}$ the input vector $\bar{x}$, expresses as a binary string the state of vehicle occupancy at various trajectory segments, for example, trajectory segments along the same vehicle trajectory, as show in Table 1 above where the length of $\bar{x}$ is equal to the number of segments of the site for which traffic planning is being performed.

FIG. 7B shows another example network architecture of such a classifier model which is trained to answer the question: is the traffic situation expressed by $\bar{x}$ a deadlock or not?

In FIG. 7B the classifier is provided with a candidate planned vehicle trajectory input $\bar{x}$ in the form of a set of features of the planned trajectory, such as those shown in table 1 above. This input is then fed into an input layer of the classifier model. The input layer processing generates output which is processed by one or more hidden layers #1 to #N, which provide output to a classification layer. The output of the classification layer is a binary result indicating if the input trajectory $\bar{x}$ has met a confidence score or probability condition for leading to a deadlock situation or not, and if so, it is allocated a classification accordingly as leading to a deadlock or not.

When planning trajectories for the simple example shown in FIGS. 5 and 6, a dead lock is present if segment A, B and C are all occupied. However, the problem scales non-linearly for traffic system with hundreds of nodes and can present considerable computational challenges to solve for such systems both in terms of memory and processing power.

The classifier model shown in FIG. 7B is a simple feed-forward trained neural network in some embodiments although the representation shown is greatly simplified in FIG. 7B. In practice such a network will have many more outputs and hidden layers than those shown schematically in FIG. 7B. Moreover, in other embodiments of the classifier, other function approximators may be provided, for example, a look-up table, tile-coding, support vector machines and radial basis networks can be used to classify input traffic situations x.

Once traffic situations which represent deadlocks at a site are learnt by the classifier model, by modelling how traffic situations $\bar{x}$ at a site evolve as vehicles move along their trajectory paths, a traffic situation at a given time can be classified accordingly as a traffic situation which later evolves to a deadlock traffic situation, for example by using a search tree such as that shown in the context of FIG. 8 described in more detail below.

In some embodiments of the classifier model, the network is designed to take as input $\bar{x}$ (representing a traffic situation comprising the occupancy states of a vehicle trajectory path). This traffic situation accordingly represents a set of candidate planned vehicle trajectories at a site at a particular point in time as disclosed hereinabove). The classifier model then determines as output if the input $\bar{x}$ belongs to one of two trajectory classification classes "deadlock" and "no deadlock". The classifier is configured to have an adequate depth (in terms of network layers) and appropriate activation functions etc. so that a certain degree of confidence is obtained that the trajectory classifications the model outputs are sufficiently accurate and fit for purpose.

A training set of traffic situations for training the classifier model may be provided in some embodiments. The training set may be generated using the computer-implemented method disclosed in FIG. 9 described herein below in some embodiments. The training set buffer may be further processed and cleaned-up as a training set buffer to achieve a suitably moderate balance between deadlock and non-deadlock traffic situations.

Once the training set buffer has been moderated, a training and evaluation data set is defined and standard neural network training can be performed. The results can be assessed, and as mentioned above, the neural network can be redesigned to have a different network design, in other words, a different configuration of layers and activation functions etc., if the results output by the classifier model are not providing a good enough network classification accuracy. Table 1 represents an example of a limited set of traffic situations, such as may form part of a training set buffer for training a classifier according to some embodiments of the disclosed technology.

FIG. 8 illustrates schematically an example embodiment of a search tree of a traffic planner model according to some embodiments of the disclosed technology. The search tree models how traffic situations $\bar{x}$ at a site could evolve as an individual vehicle moves along its trajectory path over a number of time periods which for a planning horizon. As shown in FIG. 8, the planning horizon comprises 5 time-periods. A traffic situation at a given time t0 where a vehicle is occupying node s0 may evolve in the next time period to result in a site traffic situation which could be classified as a deadlock traffic situation or not. The best outcome at t0 is accordingly to perform actions as a vehicle progresses along its planned vehicle trajectory which avoid there being a deadlock traffic situation at the site within the planning horizon. In other words, even if the classifier has not classified the particular traffic situation present at the site at time t0 as being a deadlock traffic situation, if a vehicle's speed and direction along its planned vehicle trajectory change in one way, it could lead, as is shown at the bottom of FIG. 8, to a deadlock traffic situation later in time period #5.

In FIG. 8, every node corresponds to a vehicle state, representing its position at a node (or alternatively, within a segment) along its planned trajectory. The search tree represents the consequence on the traffic situation of the site of updating the vehicle position along its trajectory every time interval or period of a guided vehicle trajectory within its planning horizon, wherein the time periods forming the planning horizon are labelled from #1 to #5 in FIG. 8. A vehicle trajectory search tree model such as that shown in FIG. 8 illustrates the consequences of actions which guide or control how a vehicle moves or does not move along its trajectory using different commands over the duration of the planning horizon. In the embodiment shown in FIG. 8, the planning horizon is limited to 5 steps, although longer trajectories may be modelled using longer planning horizons in some embodiments. So, for example, in FIG. 8, a vehicle has a start state s0 which could represent, for example, vehicle 100a initially occupying node A1 shown in FIG. 5 at time t0. Two commands could be provided to control the movement of vehicle 100a to guide it along its trajectory starting from state s0 which would result in the vehicle 100a performing one of two available initial actions. Action a=zero (a=0) corresponds to letting the vehicle wait at node A1 in FIG. 5 wait, action a=1 corresponds to the vehicle 100a moving from node A1 to node A2 in FIG. 5, in other words, for the vehicle state to change from state S0 to state S2.

If no deadlock classifier is used at the start of time PERIOD #1 to predict the movement of other vehicles at the site over that and subsequent PERIODs #2, #3, #4 and #5, the search tree used by the traffic planner may guide the vehicle 100a to move it from node A1 to A2 using action 1 as it is not aware that such a move will result in a deadlock traffic situation for all the vehicles at the site by PERIOD #5, as shown in FIG. 8, where the vehicle 100a cannot move due to the segments occupied by the other nodes and the traffic constraints operating for nodes A4, A5, A6, D15, D16, and D17, which prevent vehicles 100b, 100c from being able to move as well as vehicle 100a.

If the example of the trajectory classifier had instead using a trajectory deadlock classifier model according to the disclosed embodiments such as that shown in FIG. 8, then the search tree could have been used to predict the various traffic situations which could result and the classifier for traffic situations at that site could have indicated which of the various traffic situations which could result would be classified as deadlock traffic situations. Base on the search tree shown in FIG. 8, the destination node for taking action 1 would result in a site traffic situation which, using the classifier model, would be a terminal state classified as a deadlock state for that vehicle as a result of the behaviour not just of that vehicle but also as a result of the behaviour of other vehicles at the site. This knowledge would allow the traffic planner to discard taking action 1 as shown in FIG. 8 for example, and instead focus on determining a sequence of actions starting with action a=0 to cause the vehicle to remain at a node or to progress to another node within a time-period which leads to the site traffic situation not having a deadlock within the planning horizon. In other words, a sequence of actions can be determined for a vehicle to follow so that its speed and direction along its planned trajectory path allow that vehicle to reach its goal terminal state (in other words, its planned destination). without encountering a deadlock on the way within the planning horizon.

Thus, by creating a search tree and using the deadlock classifier the disclosed technology enables a candidate vehicle trajectory at a site to be assessed within the planning horizon so that if the trajectory will or could with a certain degree of confidence, lead to a deadlock, it can be adapted or another trajectory selected.

In some embodiments of the disclosed technology, a traffic planner is provided for a planning plurality of guided heavy-duty vehicle trajectories within a defined, in other words predetermined region. A defined or predetermined region may comprise, for example, a site or other defined or predetermined area in some embodiments, although in some embodiments the region may comprise a route between two sites. Some embodiments of the traffic planner comprise a deadlock classifier model trained to classify an traffic situation for vehicle traffic following guided vehicle trajectories within the region, wherein the trained deadlock classifier is configured to output a traffic deadlock classification based on an input traffic situation representation for multiple vehicle trajectories within the region in some embodiments and is configured, based on an input traffic situation representation of the area at an initial time period to generate a predicted deadlock classification of a subsequent traffic situation for that input traffic situation representation at one or more subsequent time periods. The plurality of heavy-duty vehicle trajectories collectively may be presented at any given point in time by a traffic situation x. By modelling of a set of candidate vehicle's move along their planned trajectories at a site, in other words, how the traffic situation at a site evolves as vehicles move along their candidate trajectory paths, where a traffic situation at a given time has been classified accordingly as a deadlock or non-deadlock traffic situation, it is possible to predict if an action taken to move in a particular direction and/or at a particular speed between nodes or segments along a vehicle trajectory or if an action which results in a vehicle remaining at rest or otherwise remaining at a node or within a vehicle segment in a particular time period should be taken or not based on whether as a result of that vehicle taking a particular action, the traffic situation for the site as a whole could later evolve to a deadlock traffic situation or not. The evolution of a vehicle in terms of actions taken within particular time-periods may be modelled in some embodiments, by using a search tree such as that shown in the context of FIG. 8, where each action is assessed to see if it results in a traffic situation at the site which has been previously classified as being a deadlock or non-deadlock traffic situation using a suitably trained traffic situation classifier, also referred to herein as a deadlock classifier.

The deadlock classifier may be trained in some embodiments using a training data set generated by an traffic situation representation generator, wherein the traffic situation representation generator is configured to generate, for a plurality of vehicles following vehicle trajectories within the predetermined area, a binary traffic situation representation for the predetermined area comprising, for each of the plurality of vehicles, an initial vehicle trajectory segment location (for example, the occupancy state of each segment or node along the or a trajectory path) in the predetermined area and a subsequent deadlock status for that traffic situation. Examples of binary traffic situation representations include those shown above in table 1. The predicted deadlock classification classifies a traffic situation for a particular site, in other words, it classifies a traffic situation for a defined area or region, as having predicted deadlock classification status if the traffic situation comprises at least two vehicles which are predicted to or which are likely to above a confidence level experience a traffic deadlock situation in the next time period within the traffic horizon. In some embodiments, the prediction may extent from the next time-period to determining if the vehicles are likely to experience a traffic deadlock at one or more subsequent time periods up to the limit of the planning horizon of the model used to perform the deadlock classification prediction whilst each vehicle follows a predetermined trajectory through the predetermined area.

At each of the one or more subsequent time periods a vehicle either advances to a next segment location along its trajectory or waits at its current segment location. A deadlock classification will be assigned to a candidate vehicle trajectory if this has a model representation which indicates two or more vehicles on that candidate vehicle trajectory are unable to advance to their next segment locations along their trajectories in the one or more subsequent time periods, in other words, up to the traffic planning horizon.

In some embodiments, the vehicles are heavy-duty vehicles are autonomous heavy-duty vehicles following predetermined vehicle trajectories in a predetermined region or area such as a site. Examples of site include harbours, mining sites, construction sites, stations, air-ports and the like.

A vehicle trajectory is defined herein to comprise a path followed by a vehicle along with the speed of the vehicle along that path and its direction of travel along the path. A vehicle trajectory for a vehicle, especially for an articulated vehicle, may also include vehicle pose information in some embodiments. Some embodiments of the invention also take into account the number of vehicles following the same trajectory so that their distance apart and speeds can be adapted to avoid deadlock situations arising in a traffic constrained area long a (the) vehicle trajectory (trajectories).

Examples of traffic constrained areas include contraflow-type situations or any similar location along a trajectory where there is a narrowing in the road surface along a vehicle trajectory where vehicles have to pass each other in single file. A traffic constrained area may also be created by a task that a vehicle has to perform at a particular location along its trajectory. For example, lack of access to an available loading bay or a refuelling point along a trajectory may also create a deadlock situation, if a vehicle occupying such a location cannot vacate the location because another vehicle is occupying the next available location along its trajectory.

A traffic deadlock is a traffic "impasse" situation which may occur along or at the destination or start of a vehicle trajectory in a traffic constrained area. A traffic constrained area is an area where node occupancy is restricted. The occupancy restriction may be for a number of nodes which are on the same vehicle trajectory or for nodes on different vehicle trajectories.

A deadlock situation occurs when two or more nodes in a traffic constrained area enter a cyclic state of occupancy such that a first node within the traffic constrained location cannot be vacated until another node in the traffic constrained location has been vacated, where the other node in the traffic constrained location cannot be vacated until the first node has been vacated, for example, see the deadlock situation illustrated schematically in FIG. 4A. A deadlock can accordingly occur with multiple vehicles are all following the same trajectory path as shown in FIG. 4A but are occupying different nodes along that trajectory path or amongst multiple vehicles each following different trajectories/trajectory paths that enter the traffic constrained area from different directions as shown schematically in FIGS. 3 and 4A.

The traffic planner may be configured to plan guided vehicle trajectories within a predetermined area or site which includes at least one traffic constrained location. Examples of a traffic constrained situation include one-way route or other vehicle occupancy restriction. Examples of sites or defined areas include a construction site, a factory, an airport, a harbour or dock, and a mine or similar excavation area. In some embodiments, the predetermined traffic constricted area comprises a one-way section of a route along which multiple vehicle trajectories pass.

The traffic planner search tree schematically illustrated in FIG. 8 shows how using a classifier model at the start of a planning horizon, in other words at time t0, to classify possible outcomes of various actions, for example action a=0 or a=1 in the first time period t0 following by subsequent actions performed on a vehicle, at the same time as other vehicles are moving within the same site to guide them along a planned trajectory allows predictions to be made by the classifier about which actions will lead to a deadlock in a subsequent time period (up to the planning horizon). By using a classifier to predict which actions result in a trajectory which will end up in a deadlock using the traffic planner search tree, trajectories can be more reliably identified off-line which when implemented reduce the likelihood of or avoid completely subsequent deadlocks. Advantageously, this allows the traffic planner to select actions to guide a set of vehicles along vehicle trajectories and/or to plan for a number of vehicles to follow the same trajectory whilst observing segment occupancy constraints in a way that reduces reduce the likelihood of a deadlock occurring along any traffic constrained areas long their trajectory/trajectories.

The traffic planner search tree model takes as input a vehicle segment occupancy state s0 and based on an action updates the state of that segment.

In some embodiments, based on the outcomes determined using the vehicle trajectory deadlock classifier, the traffic planner can select for each vehicle a vehicle trajectory which avoids a deadlock occurring within the planning horizon. In this way, particularly in embodiments where the traffic planner is configuring a plurality of vehicle trajectories within a site or similar defined area where there may be one or more traffic constrained areas or locations, the traffic planner can optimize the efficiency of the vehicle movements within the site so as to improve vehicle-related operations. For example, to avoid congestion at loading or unloading locations or at fueling sites.

In some embodiments, a training data set for a particular predefined region such a defined site is generated by a traffic situation generator. The training data set comprises a set of traffic situations for the defined region, each traffic situation representing the occupancy state of a series of segments, each segment comprising one or more nodes along a planned vehicle trajectory path within the defined region. Each segment is covered by occupancy rules which determine a number or maximum number of vehicles which may occupy that segment. Only one vehicle can occupy a node in a segment at a time. In some embodiments, only one vehicle can occupy a segment at a time. In some embodiments, a traffic constrained location in the defined region is a set of two or more segments which share a maximum vehicle occupancy limit. For example, two or more segments may be treated as having reached their maximum vehicle occupancy even though only one segment is occupied on some embodiments. The training data set may be used to provide input traffic situations to train a traffic situation classifier to classify an input traffic situation as a deadlock traffic situation at the defined region or as a non-deadlock traffic situation. By understanding which traffic situations are or will lead to a vehicle deadlock in the defined region, it is possible to explore candidate vehicle trajectories within a planning horizon to determine, depending on a plurality of initial trajectory segment locations of vehicles within the defined area, what actions on which vehicle(s) will lead to a predicted future vehicle deadlock traffic situation.

In some embodiments, the training data set generated by the traffic situation representation generator comprises a set of traffic situations for the predefined region, each traffic situation representing a given number of vehicles at a plurality of trajectory segment locations in the area, wherein each traffic situation may be associated with a classification indicating if it is or will lead to a predicted future vehicle deadlock status. By feeding the training set data to a classifier model, the classifier can be trained to recognise when a traffic situation is a deadlock traffic situation at that particular defined region or not. In some embodiments, the classifier may be trained as well based on outcomes from the search tree model used to recognise when an individual vehicle trajectory is likely to result later in a deadlock traffic situation in the defined region.

In some embodiments, a traffic constrained location within the defined region comprises a set of two or more segments along vehicle trajectories which follow the same trajectory path. In some embodiments, the traffic constrained location comprises a location in the defined region through which a plurality of vehicle trajectories pass in different directions. The traffic constrained location may be modelled using one or more traffic constraint conditions, which may include an occupancy state which affects two or more segments along a vehicle trajectory passing through the traffic constrained location. For example, a traffic constraint condition may comprise a requirement that two or more vehicle segments along a vehicle trajectory path along which traffic passes in different directions in the traffic constrained location are treated as a one-way sections in any given time period such that only one vehicle at a time may occupy one of the two or more vehicle trajectories in the traffic constrained location.

In some embodiments, the traffic constrained location within the defined region through which a plurality of vehicle trajectories pass comprises a one-way section of a route along which at least two vehicle trajectories pass in different directions.

Figure 9:
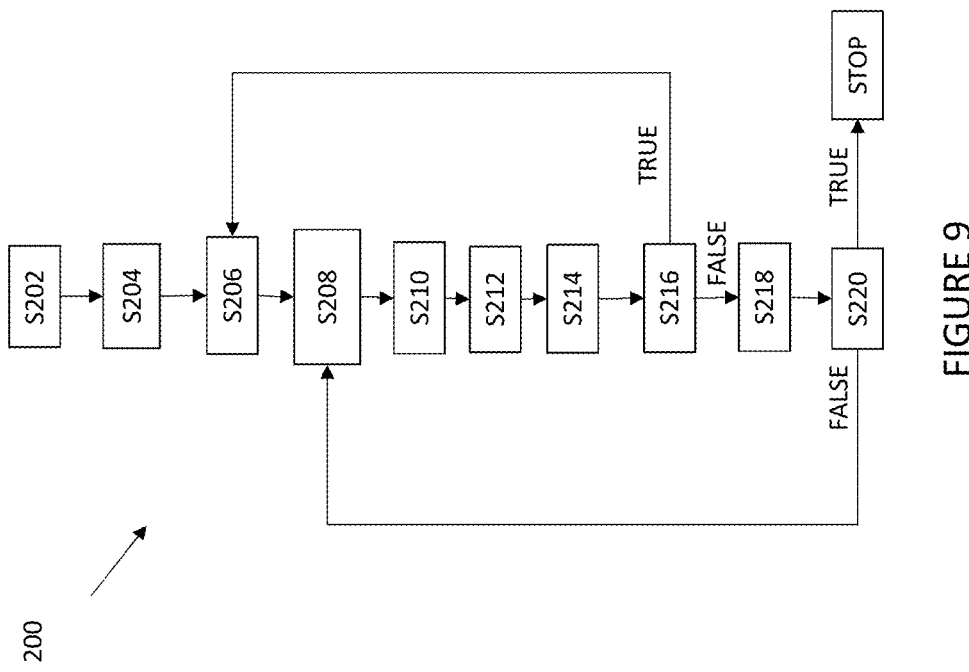
FIG. 9 illustrates schematically an example of a method for training a deadlock classifier according to some embodiments of the disclosed technology.

FIG. 9 illustrates schematically an example of a method for training a deadlock classifier according to some embodiments of the disclosed technology. FIG. 9 shows schematically an example method 200 for constructing a training data set comprising traffic scenarios for a predetermined site within which a number of vehicles are to following predetermined paths. The method 200 can be implemented in pseudo as follows:

S202: Define an empty training set buffer
S204 Initially define the number of vehicles, which must be two or more as deadlock is not possible with fewer vehicles
S206 Randomly locate the defined number of vehicles along trajectories at the site at the start of time PERIOD t0. The vehicle must be initially placed at different segments on a site trajectory.
S208 Select a random action, in other words, move the vehicle, or not move the vehicle,
S210 Update the node location in the next time PERIOD for the vehicles
S212 Check if vehicles are in deadlock by determining if any vehicles cannot move to an empty node in the next PERIOD;
S214 Add the vehicle configuration in terms of their node locations and the deadlock status to the training set buffer
S216 If (Deadlock=true) go to S206.
S218 If (addVehicleCondition=true) increase number of vehicles by one vehicle
S220 If (stopCondition is true) stop execution, else
s222 Goto S208

Here the (addVehicle Condition) is true if no deadlock situations have been found within the planning horizon for a specific set of test situations, and the stop condition is true if the number of vehicles exceeds a predetermined number of maximum vehicles operating at the site. S212 can be checked by logic determining that regardless of the next planned vehicle action along its no vehicle will move in some embodiments.

In some embodiments, the method 200 may be used to generate a training data set comprising a plurality traffic scenarios for a group of vehicle trajectories, such as trajectories within a predetermined area or site, to train a deadlock classifier model such as that shown schematically in FIGS. 5A and 5B. Once the deadlock classifier model has been trained, it can be used in some embodiments by a traffic planner to optimize the movement of individual vehicles or a fleet of vehicles which are required to following predetermined vehicle trajectory path(s) to perform one or more tasks within the predetermined area or site. Examples of defined regions such as predetermined areas or sites for which vehicle movement along guided vehicle trajectories may be optimised in this way include construction sites, harbours, airports, railway depots, factories, mines and the like, and in some embodiments, a defined region may extend to include a route or routes between two defined areas or sites.

One advantage with a neural network classifier model rather than another non-neural network based classifier model is that it is usually reasonably fast when requested to reply with a deadlock class given an input vector representing a traffic situation at a particular define region. Another advantage is that it can, if well trained and deep enough, map any input output relation.

In some embodiments, in S206 of the pseudo code above, "Randomly locate the vehicles", can be replaced with an alternative non-random approach. A specific subset of segments can be picked from a total set of segments, in a specific set of ways. For a moderate number of segments, an exhaustive setting of start location can be performed by finding all the combinations.

FIG. 10 illustrates schematically an example method 300 of adjusting a vehicle's trajectory which may be performed in real-time or used to plan a trajectory off-line in some embodiments. The method 300 is performed by a traffic planning server 102 which uses a search tree to evaluate candidate vehicle trajectories within a planning horizon, for example, such as that shown schematically by way of example in FIG. 8 (also referred to herein as a traffic planner) according to some embodiments of the disclosed technology. In FIG. 10, a location of a vehicle 100 in a defined region is determined in 302. For example, a vehicle may determine its location in 302, by, for example, using internal and/or external location sensors/beacons. A location may be determined in absolute terms, for example, using GPS co-ordinates, and/or be determined as a relative location, for example, in relative terms, such as proximity to one or more location beacons located along its trajectory, for example, a location may use well-known techniques such as triangulation to pin-point the vehicle location based on the received signal strengths and triangulation or similar techniques. If the location of the beacons is known, it is possible to also determine its geographic location of the vehicle as well as its relative location to the beacons.

Once the vehicle 100 has suitably determined its location in 302, this is mapped to a node or segment location along its planned trajectory within the defined area by sending the vehicle location in 304 to a traffic planning server or server system 102 which is configured to implement traffic planning along for that vehicle to guide that vehicle along a trajectory and at least one other vehicle along the same or another trajectory. If the vehicle trajectory is being planned off-line, the vehicle trajectory may be determined directly by the traffic planning server or server system 102 in terms of a node or segment location along a candidate vehicle trajectory at a given time interval in some embodiments.

The traffic planning server 102 uses the current vehicle location information for each vehicle along that vehicle's trajectory path to establish a segment or node occupancy state along the planned vehicle trajectory resulting from that vehicle's location, in other words, which node the vehicle is currently occupying along its vehicle trajectory path. In some embodiments, it may be possible if the vehicle is reporting its compliance with a planned vehicle trajectory for the vehicle to report to the server its location including the node and/or segment of its trajectory that it is occupying, The traffic planning server 102, based on the defined state of that vehicle 100 and its knowledge of all other vehicles having trajectories within the same defined location as that of the vehicle's trajectory which the traffic planner 104 is guiding, is able to generate a present state of the traffic situation at the predefined region. In other words, it can model the trajectories of all of the vehicles as a traffic situation in 304 which represents a current or present state of all of the vehicles having trajectories in the defined region for which the traffic planner it has responsibility.

The traffic planning server 102 then evaluates all possible future vehicle states of that vehicle by determining if a deadlock will occur in the defined region for that vehicle and any of the other vehicles within the planning horizon from the present vehicle states in 306 to determine the best trajectory for vehicle 100 to follow in 308.

If the best trajectory differs from a vehicle's current trajectory, the vehicle trajectory can be adjusted by the server in 310 and the adjusted trajectory information can be transmitted to that vehicle. As shown in FIG. 10, the traffic planning server 102 has determined that the best trajectory for vehicle 100 to follow is different from the current trajectory that vehicle 100 is following and accordingly sends adjusted trajectory information back to vehicle 100, responsive to which vehicle 100 adapts its vehicle trajectory in 312.

In this way, in some embodiments of the disclosed technology, a traffic planner server 102 can be used to adjust guided vehicle trajectories in real-time in some embodiments.

Alternatively or in addition, in some embodiments of the disclosed technology, the traffic planner 102 can be used to check candidate vehicle trajectories to see how they may affect other vehicle trajectories in the defined region. For example, when adding a new vehicle to a construction site, it may be useful to assess how its planned guided vehicle trajectory might result or avoid deadlock situations arising due to the prevailing guided vehicle trajectories of other vehicles already operating in that construction site. By assessing one or more candidate guided vehicle trajectories for a new vehicle in advance of actually guiding the vehicle at the site, adjustments can be made by the traffic planning server to an assessed candidate vehicle trajectory and/or to the guided trajectories of one or more of the other vehicle already operating in the site so that the risk of deadlock at that site when the new vehicle is deployed is reduced or eliminated.

As shown in FIG. 10, the method 300 repeats with each iteration of a planning time interval or period which is used to subdivide the vehicle trajectories into segments or nodes. In other words, after the traffic planner has determined an action to be taken for the present time interval for each of the plurality of vehicles it is planning vehicle trajectories for, it checks the updated planning horizon and if required, adjusts the next action to be taken along the vehicle's planned trajectory to avoid any traffic situation deadlocks which may be predicted within the new planning horizon.

Some embodiments of the method 300 shown in FIG. 9 comprise a computer-implemented method for generating a training data set comprising a set of traffic situations for training a traffic planner, for example a traffic planner for a defined area such as a site or region. The computer-implemented method comprises in some embodiments determining, for two more heavy-duty vehicles where each heavy-duty vehicle is configured to be guided along a planned vehicle trajectory in the defined area, an empty training set buffer. The empty training set buffer comprises a plurality of segments along each of the planned trajectories, and includes at least one confined area along the planned vehicle trajectory.

In some embodiments of the computer-implemented method, the method involves placing each of the vehicles on different initial trajectory segments in the confined area. The method then determines an initial period deadlock status of each vehicle, and selects, for each vehicle, an action for the next period, before determining a next period deadlock status for each vehicle. The method then determines a traffic situation representation for the defined region or area, in other words, for a particular site, and assesses its deadlock status using the classifier for the next period. Based the next period deadlock status of the traffic situation at the site, the deadlock status of each vehicle following a planned trajectory can be assessed. The traffic situation defined area representation and associated traffic situation representation deadlock status, in other words the classification of the traffic situation can then be added to the training data set.

In some embodiments of the method 300, the method further comprises, if the traffic situation representation deadlock status indicates there is no deadlock, iteratively increasing the number of vehicles and for each iteration until a maximum number of vehicles is reached repeating the steps of: placing each of the vehicles on different initial trajectory segments, determining an initial period deadlock status of each vehicle, selecting, for each vehicle, an action for the next period, determining a next period deadlock status for each vehicle, determining an traffic situation representation deadlock status for the next period based the next period deadlock status of each vehicle, and adding the traffic situation representation and associated traffic situation representation deadlock status to the training data set.

In some embodiments, determining the next period deadlock status for each vehicle comprises determining if two or more vehicles have moved or not moved to the next segment along their trajectories in that period, wherein if two or more vehicles have not moved, those vehicles each have a deadlock status.

In some embodiments, the action for the next period is randomly or pseudo-randomly selected.

In some embodiments, the vehicles are placed randomly or pseudo randomly on the different initial trajectory segments.

In some embodiments, the vehicles comprise autonomous or semi-autonomous heavy-duty vehicles following predefined trajectories passing through the a confined area.

In some embodiments, the confined area comprises a one-way route restriction in one of: a construction site, an airport, a harbor, a factory, and a mine.

In some embodiments, a computer-implemented method of training a deadlock traffic classifier is provided where the method comprises generating a training data set using an embodiment of the method 200 disclosed hereinabove and inputting training data from the training data set into the deadlock traffic classifier until the output from the deadlock traffic classifier meets an accuracy condition for an input binary traffic situation representation.

In some embodiments, the method of determining if vehicle traffic comprising a plurality of heavy-duty vehicles is following a plurality of guided vehicle trajectories in an area will lead to a vehicle deadlock, further comprises generating a traffic situation representation of the area comprising, for each of the plurality of vehicles, an initial planned vehicle trajectory segment location, for example, which node or segment does each of the plurality of vehicles occupy, and a subsequent deadlock status, inputting the traffic situation representation to a traffic deadline classifier trained to output a traffic deadlock classification based on an input traffic situation representation, and, based on an input traffic representation, generating a predicted deadlock classification of a subsequent traffic situation for that input traffic situation representation.

In some embodiments, the method is implemented using a neural network configured to receive as an input vector a binary string representation of a traffic situation along a vehicle trajectory path, wherein binary string comprises a plurality of elements, for example, elements representing vehicle occupancy of segments along the vehicle trajectory where a vehicle grid-lock may occur, each element representing an occupancy state of a traffic segment along one or more vehicle trajectories in the confined area. The traffic deadlock classifier model may comprise one of the above described classifiers, for example, it may comprise one or more of a suitably configured a feed forward neural network, a look-up table, a support vector machine, and a radial basis model which may be trained using the above method 300.

Although the above disclosed embodiments have related to using a traffic planner to classify planned vehicle trajectories, it is also possible, using the results of the classification, to us the traffic planner and dead-lock classifier to plan a site so that the actual locations along a vehicle trajectory path are optimized to reduce the likelihood of candidate vehicle trajectories within that site leading to deadlock traffic situations.

In other words, in some embodiments, a method of configuring a site layout is provided in which a plurality of heavy-duty vehicles are planned to follow guided trajectories between a plurality of locations within the site where the method comprises determining, using the disclosed technology, if vehicle traffic comprising a plurality of vehicles following a plurality of predetermined vehicle trajectories in the site layout will lead to a vehicle deadlock, and if so, modifying the locations on the site until the predetermined vehicle trajectories do not lead to a deadlock.

Figure 11:
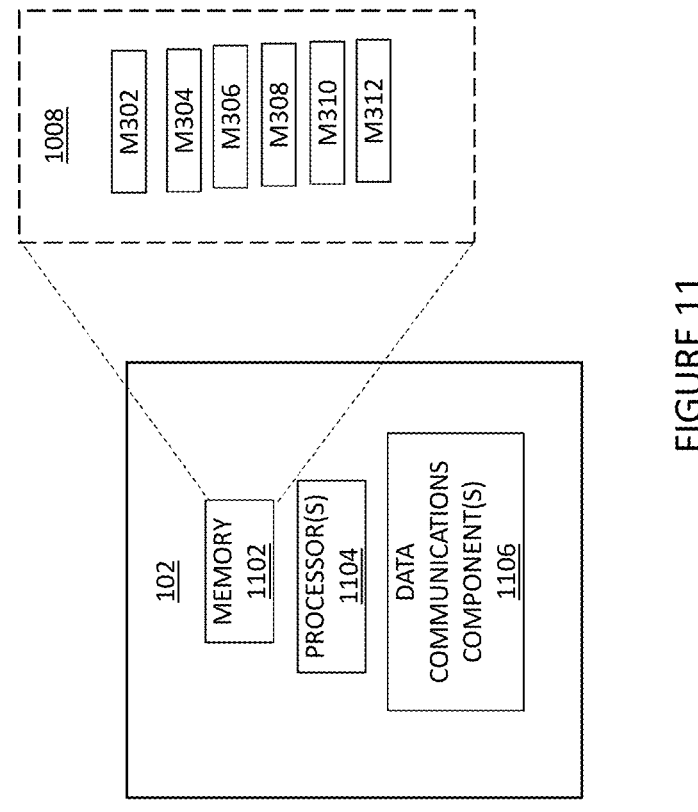
FIG. 11 shows an example of an apparatus including computer program code configured when executed to cause

Some, if not all, of the above embodiments may be implemented using computer program code which may be provided as software or hardcoded, for example, as a computer program product configured to be used by a device mounted on or integrated in a vehicle. For example, FIG. 11 shows an apparatus 102, for example, an embodiment of the traffic planning server or server system 102 which comprises suitable memory 1102, one or more processor(s) or processing circuitry 1104. In some embodiments of the server 102, and as shown in FIG. 11, one or more data communication component(s) 1106 may be provided at the server to enable communications with one or more remote entities. For example, in some embodiments a suitable receiver/transmitter/antenna arrangement is provided to communicate planned vehicle trajectories with one or more vehicles 100 which form a planned fleet of vehicles intended to operate at a particular site or which are operating at a particular site to update the vehicles' planned vehicle trajectories at the site or defined region.

The memory 1102 stores computer program code 1008 which, when loaded from the memory and executed by the one or more processor(s) or processing circuitry configures the apparatus 102 to perform one or more of the disclosed method embodiments 200, 300 for example. For example, in the embodiment of the computer program code shown in FIG. 11, the computer program code 1008 comprises a set of computer code modules M302-M310 which correspond to steps S302 to S310 shown in FIG. 10. For example module 302 may comprise software or circuitry which when executed determines a vehicle location. For example module 304 may comprise software or circuitry which when executed defines a present state of vehicles at a defined region. For example module 306 may comprise software or circuitry which when executed evaluates one or more future vehicle states based on the present state information of a vehicle. For example module 308 may comprise software or circuitry which when executed determines the best trajectory based on the previous evaluation for a given time interval within a planning horizon. For example module 310 may comprise software or circuitry which when executed adjusts a vehicle trajectory if required. The adjustment may be performed off-line in some embodiments when a vehicle trajectory is being planned off-line, but in some embodiments instead the adjustment may be transmitted wirelessly to a vehicle already following an earlier planned vehicle trajectory at the site in real-time or used to update the vehicles trajectory when it is powered down or performing a task where such an update will not impact its operational efficiency or behavior. Module 312 may comprise software or circuitry which when executed receives adjusted trajectory information and which performs the trajectory adjustment, either in real-time or off-line.

In some embodiments, the computer program product comprises computer-code which when executed by one or more processors of the vehicle, causes the vehicle to implement a method according to any one of the above disclosed embodiments.

The methods described above may be at least partly implemented through one or more processors, such as, processors or processing circuitry together with computer program code for performing the functions and actions of the embodiments herein. The program code mentioned above may also be provided as a computer program product, for instance in the form of a data carrier carrying computer program code or code means for performing the embodiments herein when being loaded into the processing circuitry. The data carrier, or computer readable medium, may be one of an electronic signal, optical signal, radio signal or computer-readable storage medium. The computer program code may e.g. be provided as pure software program code or by hardware or a combination of both, and may be downloaded as a signal to a control unit of an apparatus for execution. Thus, it should be noted that the functions of the control unit may in some embodiments be implemented as computer programs stored in memory, for example, a computer readable storage unit, for execution by processors or processing modules.

Those skilled in the art will also appreciate that the processing circuitry and the memory or computer readable storage unit described above may refer to a combination of analog and digital circuits, and/or one or more processors configured with software and/or firmware, e.g. stored in a memory, that when executed by the one or more processors such as the processing circuitry perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Where the disclosed technology is described with reference to drawings in the form of block diagrams and/or flowcharts, it is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

The description of the example embodiments provided herein have been presented for the purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

The various example embodiments described herein are described in the general context of methods, and may refer to elements, functions, steps or processes, one or more or all of which may be implemented in one aspect by a computer program product, embodied in a computer-readable medium, including computer-executable instructions, such as program code, executed by computers in networked environments.

A computer-readable medium may include removable and non-removable storage devices including, but not limited to, Read Only Memory (ROM), Random Access Memory, RAM), which may be static RAM, SRAM, or dynamic RAM, DRAM. ROM may be programmable ROM, PROM, or EPROM, erasable programmable ROM, or electrically erasable programmable ROM, EEPROM. Suitable storage components for memory may be integrated as chips into a printed circuit board or other substrate connected with one or more processors or processing modules, or provided as removable components, for example, by flash memory (also known as USB sticks), compact discs (CDs), digital versatile discs (DVD), and any other suitable forms of memory. Unless not suitable for the application at hand, memory may also be distributed over a various forms of memory and storage components, and may be provided remotely on a server or servers, such as may be provided by a cloud-based storage solution. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The memory used by any apparatus whatever its form of electronic apparatus described herein accordingly comprise any suitable device readable and/or writeable medium, examples of which include, but are not limited to: any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry. Memory may store any suitable instructions, data or information, including a computer program, software, an application including one or more of logic, rules, code, tables, etc. and/or other instructions capable of being executed by processing circuitry and, utilized by the apparatus in whatever form of electronic apparatus. Memory may be used to store any calculations made by processing circuitry and/or any data received via a user or communications or other type of data interface. In some embodiments, processing circuitry and memory are integrated. Memory may be also dispersed amongst one or more system or apparatus components. For example, memory may comprises a plurality of different memory modules, including modules located on other network nodes in some embodiments.

In the drawings and specification, there have been disclosed exemplary aspects of the disclosure. However, many variations and modifications can be made to these aspects which fall within the scope of the accompanying claims. Thus, the disclosure should be regarded as illustrative rather than restrictive in terms of supporting the claim scope which is not to be limited to the particular examples of the aspects and embodiments described above. The invention which is exemplified herein by the various aspects and embodiments described above has a scope which is defined by the following claims.

The following clauses set out examples of the present disclosure.

1. A computer-implemented traffic planner for planning a plurality of guided heavy-duty vehicle trajectories within a defined region where a traffic situation has at least one traffic constrained location, the traffic planner comprising: a deadlock classifier model trained to classify a traffic situation for vehicle traffic following guided vehicle trajectories within the defined region, wherein the trained deadlock classifier is configured to output a traffic situation deadlock classification based on an input traffic situation representation, $\bar{x}$, of multiple trajectories within the region, and wherein the traffic planner is configured, based on an input traffic situation representation of the area at a time period generating a predicted deadlock classification of a subsequent traffic situation for that input traffic situation representation at one or more subsequent time periods to plan an action to perform along each guided vehicle trajectory in the predetermined region.

2. The traffic planner of clause 1, wherein the deadlock classifier is trained using a training data set generated by a traffic situation representation generator for the predetermined region, wherein the traffic situation representation generator is configured to generate, for a plurality of vehicles following vehicle trajectories within the predetermined region, a binary traffic situation representation of the predetermined area comprising, for each of the plurality of vehicles, an initial vehicle trajectory segment location in the predetermined area and a subsequent deadlock status.

3. The traffic planner according to clause 1 or 2, wherein the predicted deadlock classification classifies a traffic situation as having predicted deadlock classification status if the predicted traffic situation comprises at least two vehicles experiencing a traffic deadlock at or adjacent to the traffic constrained location at one or more subsequent time periods whilst each vehicle is guided by the traffic planner along its planned guided vehicle trajectory.

4. The traffic planner according to clause 3, wherein the traffic planner plans, at each of the one or more subsequent time periods, a vehicle trajectory along which a vehicle either advances to a next segment location along its trajectory path or waits at its current segment location on its trajectory path.

5. The traffic planner according to clause 4, wherein a deadlock classification represents two or more vehicles being unable to advance to their next segment locations along their trajectories in the one or more subsequent time periods.

6. The traffic planner according to any one of the preceding clauses, wherein the heavy-duty vehicles are autonomous heavy duty vehicles following predetermined guided vehicle trajectories in the predetermined region.

7. The traffic planner of any one of the preceding clauses, wherein the training data set generated by the traffic situation representation generator comprises a set of traffic situations for the predefined region, each traffic situation representing a given number of vehicles at a plurality of trajectory segment locations in the defined region, wherein each traffic situation is associated with a classification indicating if it is or will lead to a predicted future vehicle deadlock status.

8. The traffic planner of any one of the preceding clauses, wherein the traffic situation constrained location within the defined region through which a plurality of vehicle trajectories pass comprises a one-way section of a route along which at least two vehicle trajectories pass in different directions.

9. A computer-implemented method of generating a training data set comprising a set of traffic situations for training a traffic planner, the method comprising: for a predetermined area where two or more heavy-duty vehicles are to be configured to be guided along a planned trajectory, defining an empty training set buffer comprising segments along each of the planned trajectories including at least one traffic situation constrained area within the predetermined area;

placing each of the vehicles on different initial trajectory segments;

determining an initial period deadlock status of each vehicle;

selecting, for each vehicle, a planned action for the next period;

determining a next period deadlock status for each vehicle;

determining an area traffic situation deadlock status for the next period based the next period deadlock status of each vehicle; and adding the area traffic situation representation and associate area traffic situation deadlock status to the training data set.

10. The computer-implemented method of clause 9, further comprising, if the traffic situation deadlock status indicates there is no deadlock, iteratively increasing the number of vehicles and for each iteration until a maximum number of vehicles is reached repeating:

placing each of the vehicles on different initial trajectory segments;

determining an initial period deadlock status of each vehicle;

selecting, for each vehicle, an action for the next period;

determining a next period deadlock status for each vehicle;

determining a traffic situation representation deadlock status for the next period based the next period deadlock status of each vehicle; and adding the traffic situation representation and associated traffic situation deadlock status to the training data set.

11. The computer-implemented method of either of clauses 9 or 10, wherein determining the next period deadlock status for each vehicle comprises determining if two or more vehicles have moved or not moved to the next segment along their trajectories in that period, wherein if two or more vehicles have not moved, those vehicles each have a deadlock status.

12. The computer-implemented method of any one of clauses 9 to 11, wherein the planned action for the next period is randomly or pseudo-randomly selected.

13. The computer-implemented method of any one of clauses 9 to 12, wherein the vehicles are placed randomly or pseudo randomly on the different initial trajectory segments.

14. The computer-implemented method of any one of clauses 9 to 13, wherein the vehicles comprise autonomous or semi-autonomous heavy-duty vehicles following predefined trajectories passing through a confined area.

15. A computer-implemented method of training a deadlock traffic classifier, the method comprising:

generating a training data set using a method according to any one of clauses 9 to 14; and inputting training data from the training data set into the deadlock traffic classifier until the output from the deadlock traffic classifier meets an accuracy condition for an input binary traffic situation representation.

16. A method of determining if a vehicle traffic situation comprising a plurality of heavy-duty vehicles following a plurality of guided vehicle trajectories in a defined area will lead to a vehicle deadlock, the method comprising:

generating a traffic situation representation of the defined area comprising, for each of the plurality of vehicles, an initial vehicle trajectory segment location and a subsequent deadlock status;

inputting the traffic situation representation to a traffic deadline classifier trained to output a traffic deadlock classification based on an input traffic situation representation of traffic in the area; and based on the input traffic situation representation, generating a predicted deadlock classification of a subsequent traffic situation in the defined area for that input traffic situation representation.

17. The method of clause 16, wherein the method is implemented using a neural network configured to receive as an input vector a binary string representation of a traffic situation, wherein binary string comprises a plurality of elements where a vehicle grid-lock may occur, each element representing an occupancy state of a traffic segment along one or more vehicle trajectories in the defined area.

18. The method of clause 16 or 17, wherein the traffic deadlock classifier is modelled using one of:

a feed forward neural network;

a look-up table;

a support vector machine;

a radial basis model.

The invention claimed is:

1. A computer-implemented traffic planner for planning a plurality of guided vehicle trajectories for a plurality of heavy-duty vehicles to follow within a defined region, wherein the vehicle trajectories pass through an area where vehicle occupancy is constrained more than it is elsewhere along the vehicle trajectories in the defined region, each vehicle trajectory comprising a vehicle path and a speed and direction of travel for a heavy-duty vehicle to travel along that vehicle path, the traffic planner comprising:

a deadlock classifier model trained to predict whether or not an initial non-deadlock traffic situation, $\bar{x}$ comprising the plurality of heavy-duty vehicles having initial locations in the defined region at an initial planning time to at the start of a first planning time period will lead, in a later planning time period t within a planning horizon, to a subsequent traffic situation comprising a deadlock traffic situation, wherein each input traffic situation, $\bar{x}$, represents trajectory segment vehicle occupancies at the initial time to for vehicles following the plurality of guided vehicle trajectories within the defined region, and wherein each subsequent traffic situation represents different trajectory segment vehicle occupancies at subsequent planning time periods t by the plurality of heavy-duty vehicles following the plurality of guided vehicle trajectories;

wherein the deadlock classifier model is configured to output a prediction of the subsequent traffic situation deadlock classification up to the planning horizon based on the input traffic situation representation, $\bar{x}$, at the start of the planning horizon and wherein the traffic planner is configured, based on a received traffic situation $\bar{x}$ for a plurality of heavy-duty vehicles following guided vehicle trajectories at a time to being input to the deadlock classifier resulting in a prediction of a deadlock traffic situation at one or more subsequent times within the planning horizon, to update the subsequent vehicle actions for at least one of the plurality of heavy-duty vehicles to perform along the path of its guided vehicle trajectory.

2. The traffic planner of any claim 1, wherein the deadlock classifier model was trained using a training data set generated by a traffic situation representation generator for the predetermined region configured to generate, for a plurality of vehicles following vehicle trajectories within the predetermined region, a binary traffic situation representation of the predetermined area comprising, for each of the plurality of vehicles, an initial vehicle trajectory segment location in the predetermined area and a subsequent deadlock status.

3. The traffic planner according to claim 1, wherein a deadlock classification represents two or more vehicles being unable to advance to their next segment locations along their trajectories in the one or more subsequent time periods.

4. The traffic planner according to claim 3, wherein the traffic planner plans, at each of the one or more subsequent time periods, for each of the plurality of heavy-duty vehicles in the defined region, a vehicle trajectory along which that vehicle either advances to a next segment location along its trajectory path or waits at its current segment location on its trajectory path.

5. The traffic planner according to claim 4, wherein each of the plurality of heavy-duty vehicles follow the same path along their guided vehicle trajectories and wherein each of the plurality of heavy-duty vehicles occupies a different segment along the path at any given point in time.

6. The traffic planner of according to claim 1, wherein the number of planning time periods from the start of the initial planning time period to the planning horizon is more than one and the vehicle trajectories are adjusted dynamically in real-time.

7. The traffic planner according to claim 1, wherein the heavy-duty vehicles are autonomous heavy-duty vehicles following predetermined guided vehicle trajectories in the predetermined region.

8. The traffic planner according to claim 1, wherein the vehicle occupancy constrained area within the defined region through which the plurality of vehicle trajectories pass comprises a one-way section of a route along which at least two vehicle trajectories pass in different directions along their trajectory paths.

9. A method of determining if a vehicle traffic situation comprising a plurality of heavy-duty vehicles following a plurality of guided vehicle trajectories in a defined area will lead to a vehicle deadlock, the method comprising:

generating a traffic situation representation of the defined area comprising, for each of the plurality of vehicles, an initial vehicle trajectory segment location and a subsequent deadlock status;

inputting the traffic situation representation to a traffic deadline classifier trained to output a traffic deadlock classification based on an input traffic situation representation of traffic in the area; and based on the input traffic situation representation, generating a predicted deadlock classification of a subsequent traffic situation in the defined area for that input traffic situation representation.

10. The method of claim 9, wherein the method is implemented using a neural network configured to receive as an input vector a binary string representation of a traffic situation, wherein binary string comprises a plurality of elements where a vehicle grid-lock may occur, each element representing an occupancy state of a traffic segment along one or more vehicle trajectories in the defined area.

11. The method of claim 9, wherein the traffic deadlock classifier is modelled using one of:

a feed forward neural network;

a look-up table;

a support vector machine;

a radial basis model.

*    *    *    *    *